(12) United States Patent
Agnihotri et al.

(10) Patent No.: US 8,016,566 B2
(45) Date of Patent: Sep. 13, 2011

(54) HIGH PERFORMANCE LOW NOISE ROTORCRAFT BLADE AERODYNAMIC DESIGN

(75) Inventors: Ashok K. Agnihotri, Southlake, TX (US); Jimmy Charles Narramore, Bedford, TX (US); John J. Schillings, Fort Worth, TX (US)

(73) Assignee: Bell Helicopter Textron Inc., Hurst, TX (US)

( * ) Notice: Subject to any disclaimer, the term of this patent is extended or adjusted under 35 U.S.C. 154(b) by 870 days.

(21) Appl. No.: 11/498,274

(22) Filed: Aug. 3, 2006

(65) Prior Publication Data
US 2010/0254817 A1    Oct. 7, 2010

(51) Int. Cl.
*B64C 27/467* (2006.01)
(52) U.S. Cl. ............................ 416/223 R; 416/DIG. 2
(58) Field of Classification Search ............ 416/DIG. 2, 416/DIG. 5
See application file for complete search history.

(56) References Cited

U.S. PATENT DOCUMENTS

| 4,142,837 A * | 3/1979 | de Simone ............... 416/223 R |
| 5,456,428 A * | 10/1995 | Hegg ............................ 244/229 |
| 6,607,164 B2 * | 8/2003 | Somers ....................... 244/35 R |

FOREIGN PATENT DOCUMENTS

| EP | 0517467 A | | 12/1992 |
| EP | 0615903 A | | 9/1994 |
| JP | 11091692 A | * | 4/1999 |

OTHER PUBLICATIONS

Machine Translation of JP 11091692 A obtained at JPO website on Sep. 13, 2010.*

* cited by examiner

*Primary Examiner* — Richard Edgar
(74) *Attorney, Agent, or Firm* — Pillsbury Winthrop Shaw Pittman LLP

(57) ABSTRACT

One embodiment of the present invention is a main rotor helicopter blade for generating higher lift with less drag and delaying stall at high Mach numbers. A cross-section of this blade includes aft camber. The difference between a chord line of the cross-section and a camber line of the cross-section increases from a leading edge of the cross-section to a maximum between a trailing edge of the cross-section and a midpoint of the chord line and decreases to the trailing edge producing the aft camber of the blade. The aft camber generates higher lift with less drag and delays stall at high Mach numbers.

25 Claims, 27 Drawing Sheets

HIGH PERFORMANCE LOW NOISE ROTORCRAFT BLADE AERODYNAMIC DESIGN

BACKGROUND OF THE INVENTION

1. Field of the Invention

Embodiments of the present invention relate to helicopter systems and methods that enable a blade of a rotor of a helicopter to generate higher lift with less drag and to delay stall at high Mach numbers. More particularly, embodiments of the present invention relate to main rotor helicopter blades, helicopter systems, and methods for designing helicopter blades that include or create aft camber, which generates higher lift with less drag and delays stall at high Mach numbers.

2. Background Information

In horizontal flight, a blade of the main rotor of a helicopter acts as a moving airfoil or wing. Unlike the wing of an airplane, however, the main rotor blade of a helicopter is periodically moving in the direction of movement of the helicopter and periodically moving in a direction opposite to the direction of movement of the helicopter. Therefore, a main rotor blade of a helicopter experiences two vastly difference airspeeds in a very short period of time.

For example, if the main rotor of a helicopter is rotating at 700 feet per second and the helicopter is moving forward at 400 feet per second, a blade moving forward is experiencing an airspeed of 1,100 feet per second. When the blade is moving backward, however, it is experiencing an airspeed of only 300 feet per second. This vast change in air speed can occur in as little as two tenths of second.

The lift coefficient of a helicopter blade is a constant and is proportional to the lift divided by the square of the airspeed. Since the airspeed experienced by a blade on the backward moving side is much less than the airspeed experienced on the forward side, the lift on the backward side is much less than the lift on the forward side, creating an imbalance. One method of increasing the lift on the backward side is to increase the angle of attack of the blade on the backward side.

As the forward speed of a helicopter is increased, the angle of attack of the blade on the backward side must be increased to increase lift. At some point, the angle of attack is too great and the blade stalls. When the blade stalls, it can no longer provide increasing lift. The angle of attack at which the blade stalls defines a maximum lift capability of the blade and provides a limitation on the forward speed that can be achieved.

Another limitation on the forward speed of a helicopter is drag. If at the same time the lift of a backward moving blade of main rotor of helicopter is increased the drag is also increased significantly, the speed available due to the increased lift will be limited by the corresponding drag. As a result, it is desirable to increase the lift of a helicopter blade while maintaining the lowest possible lift to drag ratio.

The forward speed of a helicopter is also affected by the tip speed of the blades of the main rotor. The speed of a helicopter blade increases with radius so that the tip of the blade achieves the highest speed. The tip of a blade can achieve speeds approaching the speed of sound. Speeds close to the speed of sound are referred to as high Mach numbers.

As a helicopter blade reaches high Mach numbers, the blade begins to stall. The stalling of the blade, again, limits the forward speed the helicopter can achieve. As a result, it is desirable to delay the stall of the main rotor blade of a helicopter as the blade experiences a high Mach number.

In view of the foregoing, it can be appreciated that a substantial need exists for systems and methods that can advantageously provide helicopter blades with higher lift with less drag and that can delay stall at high Mach numbers.

BRIEF SUMMARY OF THE INVENTION

One embodiment of the present invention is a main rotor helicopter blade with an aft cambered cross-section where a difference between a chord line of the cross-section and a camber line of the cross-section reaches a maximum between a midpoint of the chord line and the trailing edge of the cross-section. The difference between a chord line of the cross-section and a camber line of the cross-section increases from a leading edge of the cross-section to the maximum between a trailing edge of the cross-section and a midpoint of the chord line and decreases to the trailing edge producing the aft camber of the blade. The aft camber generates higher lift with less drag and delays stall at high Mach numbers.

Another embodiment of the present invention is a main rotor helicopter blade with an aft cambered cross-section where a difference between a chord line of the cross-section and a camber line of the cross-section reaches a maximum between a leading edge of the cross-section and a midpoint of the chord line. The difference between a chord line of the cross-section and a camber line of the cross-section increases from a leading edge of the cross-section to a maximum between the leading edge and a midpoint of the chord line and decreases to a trailing edge of the cross-section. The slope of the difference sequentially decreases from the leading edge to the maximum, increases negatively from the maximum, decreases negatively, and increases negatively to the trailing edge. The slope increases negatively from the maximum, decreases negatively, and increases negatively to the trailing edge to produce the aft camber of the blade. The aft camber generates higher lift with less drag and delays stall at high Mach numbers.

Another embodiment of the present invention is a main rotor helicopter blade with an aft cambered cross-section where a difference between a chord line of the cross-section and a camber line of the cross-section reaches a maximum between a leading edge of the cross-section and a midpoint of the chord line. The difference between a chord line of the cross-section and a camber line of the cross-section increases from a leading edge of the cross-section to a maximum between the leading edge and a midpoint of the chord line and decreases to a trailing edge of the cross-section. The slope of the difference sequentially decreases from the leading edge to the maximum, increases negatively from the maximum, decreases negatively, increases negatively, and decreases negatively to the trailing edge. The slope increases negatively from the maximum, decreases negatively, increases negatively, and decreases negatively to the trailing edge to produce the aft camber of the blade. The aft camber generates higher lift with less drag and delays stall at high Mach numbers.

Another embodiment of the present invention is a main rotor helicopter blade with an aft cambered cross-section where a difference between a chord line of the cross-section and a camber line of the cross-section reaches a first maximum between a leading edge of the cross-section and a midpoint of the chord line and a second maximum between the midpoint and the trailing edge of the cross-section. The difference between a chord line of the cross-section and a camber line of the cross-section sequentially increases from a leading edge of the cross-section to the first maximum between the leading edge and a midpoint of the chord line, decreases to the second maximum between a trailing edge of the cross-section and the midpoint, and decreases to the trailing edge. The slope of the difference sequentially decreases from the leading edge to the first maximum, increases negatively from the first maximum, decreases negatively to the second maximum, and increases negatively from the second maximum to the trailing edge. The slope increases negatively from the first maximum, decreases negatively to the second maximum, and increases negatively from the second maximum to the trailing edge to produce the aft camber of the blade. The aft camber generates higher lift with less drag and delays stall at high Mach numbers.

Another embodiment of the present invention is a main rotor helicopter blade with an aft cambered cross-section where a difference between a chord line of the cross-section and a camber line of the cross-section reaches a first maximum between a leading edge of the cross-section and a midpoint of the chord line and a second maximum between the midpoint and the trailing edge of the cross-section. The difference between a chord line of the cross-section and a camber line of the cross-section sequentially increases from a leading edge of the cross-section to the first maximum between the leading edge and a midpoint of the chord line, decreases to the second maximum between a trailing edge of the cross-section and the midpoint, and decreases to the trailing edge. The slope of the difference sequentially decreases from the leading edge to the first maximum, increases negatively from the first maximum, decreases negatively to the second maximum, increases negatively from the second maximum, and decreases negatively to the trailing edge. The slope increases negatively from the first maximum, decreases negatively to the second maximum, increases negatively from the second maximum, and decreases negatively to the trailing edge to produce the aft camber of the blade. The aft camber generates higher lift with less drag and delays stall at high Mach numbers.

Another embodiment of the present invention is a main rotor helicopter blade with an aft cambered cross-section where a difference between a chord line of the cross-section and a camber line of the cross-section sequentially reaches a first maximum between a leading edge of the cross-section and a midpoint of the chord line, a minimum, and a second maximum between the midpoint and the trailing edge of the cross-section. The difference between a chord line of the cross-section and a camber line of the cross-section sequentially increases from a leading edge of the cross-section to the first maximum between the leading edge and a midpoint of the chord line, decreases to the first minimum between a trailing edge of the cross-section and the midpoint, increases to the second maximum between the trailing edge and the midpoint, and decreases to the trailing edge. The slope of the difference sequentially decreases from the leading edge to the first maximum, increases negatively from the first maximum, decreases negatively to the first minimum, increases from the first minimum, decreases to the second maximum, and increases negatively from the second maximum to the trailing edge. The slope increases negatively from the first maximum, decreases negatively to the first minimum, increases from the first minimum, decreases to the second maximum, and increases negatively from the second maximum to the trailing edge to produce the aft camber of the blade. The aft camber generates higher lift with less drag and delays stall at high Mach numbers.

Another embodiment of the present invention is a helicopter system for generating higher lift with less drag and delaying stall at high Mach numbers. The system includes a rotor blade and a control unit. The rotor blade has a cross-section that includes aft camber. The aft camber of the rotor blade generates higher lift with less drag and delays stall at high Mach numbers. The control unit mitigates an increased pitching moment generated by the rotor blade.

Another embodiment of the present invention is a method for designing an aft cambered cross-section of a main rotor helicopter blade where a difference between a chord line of the cross-section and a camber line of the cross-section reaches a maximum between a midpoint of the chord line and the trailing edge of the cross-section. A difference between a chord line of the cross-section and a camber line of the cross-section is increased from a leading edge of the cross-section to a maximum between a trailing edge of the cross-section and a midpoint of the chord line. The difference is decreased from the maximum to the trailing edge to produce an aft camber of the blade. The aft camber generates higher lift with less drag and delays stall at high Mach numbers.

Another embodiment of the present invention is a method for designing an aft cambered cross-section of a main rotor helicopter blade where a difference between a chord line of the cross-section and a camber line of the cross-section reaches a maximum between a leading edge of the cross-section and a midpoint of the chord line. A difference between a chord line of the cross-section and a camber line of the cross-section is increased from a leading edge of the cross-section to the maximum between the leading edge and a midpoint of the chord line. The difference is decreased to a trailing edge of the cross-section. A slope of the difference sequentially decreases from the leading edge to the maximum, increases negatively from the maximum, decreases negatively, and increases negatively to the trailing edge. The slope increases negatively from the maximum, decreases negatively, and increases negatively to the trailing edge to produce an aft camber of the blade. The aft camber generates higher lift with less drag and delays stall at high Mach numbers.

Another embodiment of the present invention is a method for designing an aft cambered cross-section of a main rotor helicopter blade where a difference between a chord line of the cross-section and a camber line of the cross-section reaches a maximum between a leading edge of the cross-section and a midpoint of the chord line. A difference between a chord line of the cross-section and a camber line of the cross-section is increased from a leading edge of the cross-section to the maximum between the leading edge and a midpoint of the chord line. The difference is decreased to a trailing edge of the cross-section. A slope of the difference sequentially decreases from the leading edge to the maximum, increases negatively from the maximum, decreases negatively, increases negatively, and decreases negatively to the trailing edge. The slope increases negatively from the maximum, decreases negatively, increases negatively, and decreases negatively to the trailing edge to produce an aft camber of the blade. The aft camber generates higher lift with less drag and delays stall at high Mach numbers.

Another embodiment of the present invention is a method for designing an aft cambered cross-section of a main rotor helicopter blade where a difference between a chord line of the cross-section and a camber line of the cross-section reaches a first maximum between a leading edge of the cross-section and a midpoint of the chord line and a second maximum between the midpoint and the trailing edge of the cross-section. A difference between a chord line of the cross-section and a camber line of the cross-section is increased from a leading edge of the cross-section to the first maximum between the leading edge and a midpoint of the chord line. The difference is decreased to the second maximum between a trailing edge of the cross-section and the midpoint. The difference is decreased to the trailing edge. A slope of the difference sequentially decreases from the leading edge to the first maximum, increases negatively from the first maximum, decreases negatively to the second maximum, and increases negatively from the second maximum to the trailing edge. The slope increases negatively from the first maximum, decreases negatively to the second maximum, and increases negatively from second maximum to the trailing edge to produce an aft camber of the blade. The aft camber generates higher lift with less drag and delays stall at high Mach numbers.

Another embodiment of the present invention is a method for designing an aft cambered cross-section of a main rotor helicopter blade where a difference between a chord line of the cross-section and a camber line of the cross-section reaches a first maximum between a leading edge of the cross-section and a midpoint of the chord line and a second maximum between the midpoint and the trailing edge of the cross-section. A difference between a chord line of the cross-section and a camber line of the cross-section is increased from a leading edge of the cross-section to the first maximum between the leading edge and a midpoint of the chord line. The difference is decreased to the second maximum between a trailing edge of the cross-section and the midpoint. The difference is decreased to the trailing edge. A slope of the difference sequentially decreases from the leading edge to the first maximum, increases negatively from the first maximum, decreases negatively to the second maximum, increases negatively from the second maximum, and decreases negatively to the trailing edge. The slope increases negatively from the first maximum, decreases negatively to the second maximum, increases negatively from second maximum, and decreases negatively to the trailing edge to produce an aft camber of the blade. The aft camber generates higher lift with less drag and delays stall at high Mach numbers.

Another embodiment of the present invention is a method for designing an aft cambered cross-section of a main rotor helicopter blade where a difference between a chord line of the cross-section and a camber line of the cross-section sequentially reaches a first maximum between a leading edge of the cross-section and a midpoint of the chord line, a minimum, and a second maximum between the midpoint and the trailing edge of the cross-section. A difference between a chord line of the cross-section and a camber line of the cross-section is increased from a leading edge of the cross-section to the first maximum between the leading edge and a midpoint of the chord line. The difference is decreased to the first minimum between a trailing edge of the cross-section and the midpoint. The difference is increased to the second maximum between the trailing edge and the midpoint. The difference is decreased to the trailing edge. A slope of the difference sequentially decreases from the leading edge to the first maximum, increases negatively from the first maximum, decreases negatively to the first minimum, increases from the first minimum, decreases to the second maximum, and increases negatively from the second maximum to the trailing edge. The slope increases negatively from the first maximum, decreases negatively to the first minimum, increases from the first minimum, decreases to the second maximum, and increases negatively from the second maximum to the trailing edge to produce the aft camber of the blade. The aft camber generates higher lift with less drag and delays stall at high Mach numbers.

Figure 1:
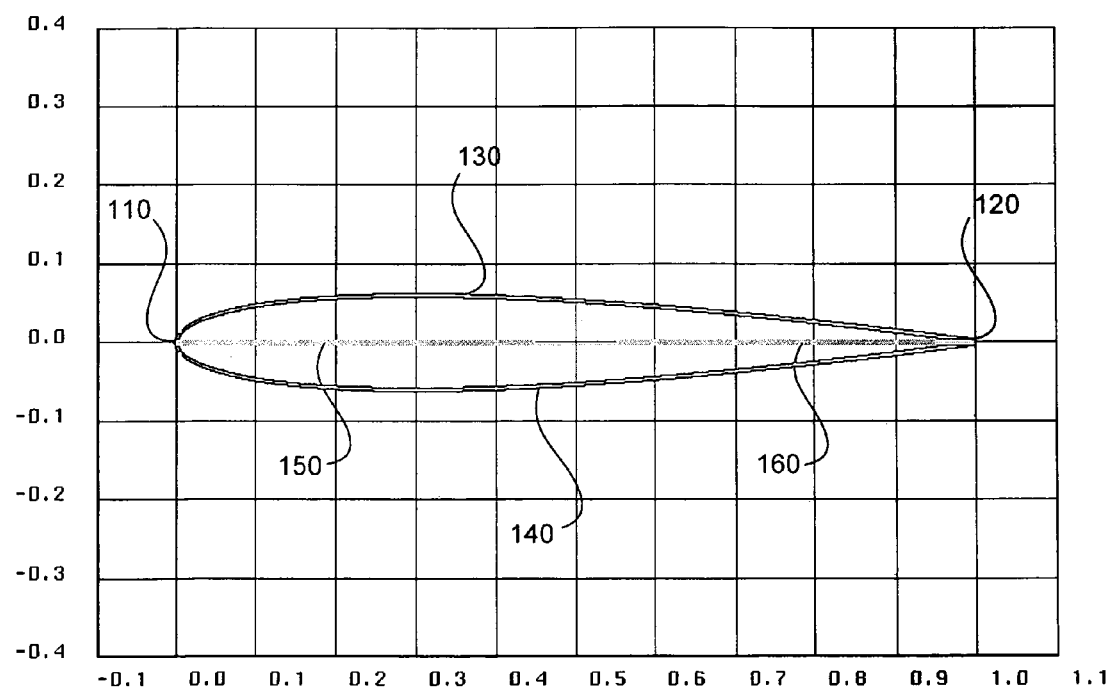
FIG. 1 is a schematic diagram of an exemplary cross-section of a main rotor blade of a helicopter where there is no difference between the chord line, and the camber line.
Figure 1:
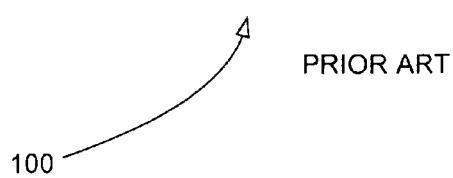

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 is a schematic diagram of an exemplary cross-section 100 of a main rotor blade of a helicopter where there is no difference between chord line 150 and camber line 160. The vertical axis represents a thickness and the horizontal axis represents a depth of cross-section 100. Cross-section 100 includes leading edge 110, trailing edge 120, upper surface 130, lower surface 140, chord line 150, and camber line 160. Chord line 150 is defined as the middle of trailing edge 120 to farthest point on leading edge 110. The middle of a trailing edge is used because blades do not usually end in a single point. A trailing edge that has a rounded or blunt trailing edge is easier to manufacture and maintain.

Camber line 160 is defined as the collection of midpoints of lines drawn from upper surface 130 to lower surface 140 and perpendicular to chord line 150. Since upper surface 130 and lower surface 140 are mirror images, chord line 150 and camber 160 are the same line for cross-section 100.

Figure 2:
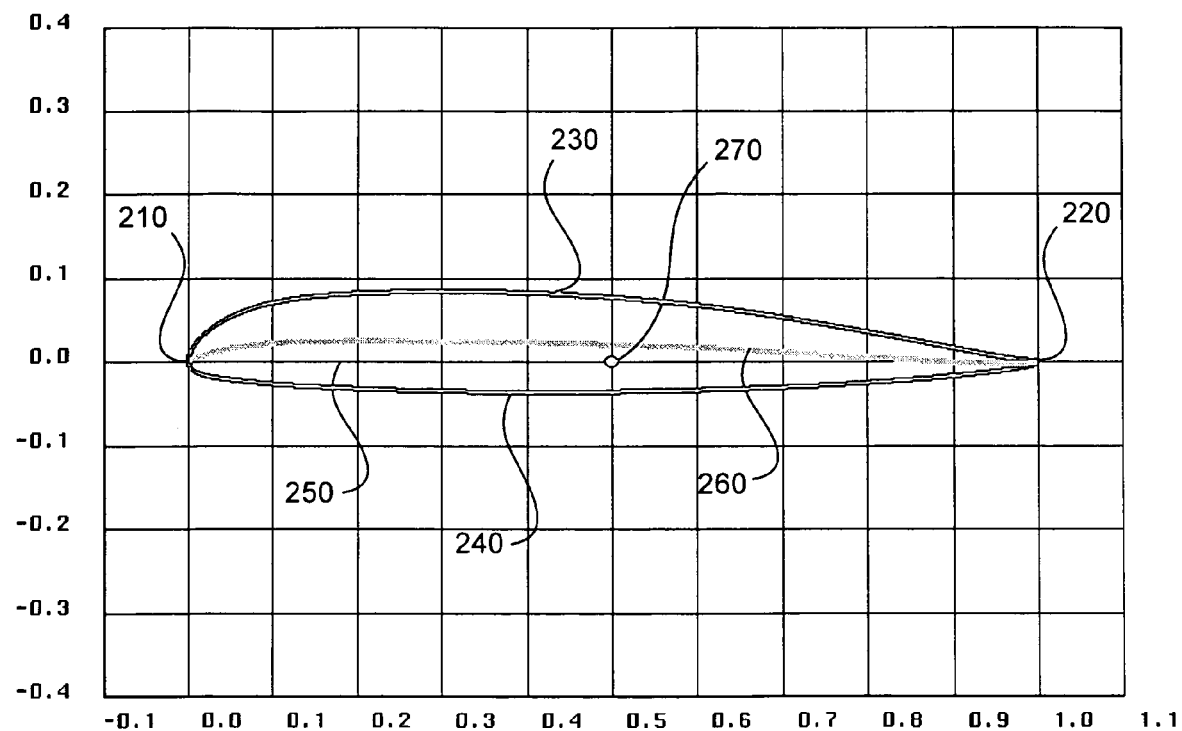
FIG. 2 is a schematic diagram of an exemplary cross-section of a main rotor blade of a helicopter where there is a difference between the chord line and the camber line representing forward camber.
Figure 2:
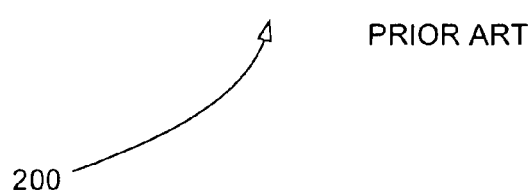

FIG. 2 is a schematic diagram of an exemplary cross-section 200 of a main rotor blade of a helicopter where there is a difference between chord line 250 and the camber line 260 representing forward camber. Cross-section 200 includes leading edge 210, trailing edge 220, upper surface 230, lower surface 240, chord line 250, and camber line 260. In cross-section 200, chord line 250 and camber line 260 are not the same line. Upper surface 230 and lower surface 240 are not mirror images. Cross-section 200 exhibits forward camber.

This forward camber can also been seen in the difference between chord line 250 and camber line 260. The difference between chord line 250 and camber line 260 represents forward camber because the difference is greatest between leading edge 210 and midpoint 270 of chord line 250. Therefore, there is more camber in the forward part of cross-section 200, or forward camber.

Figure 3:
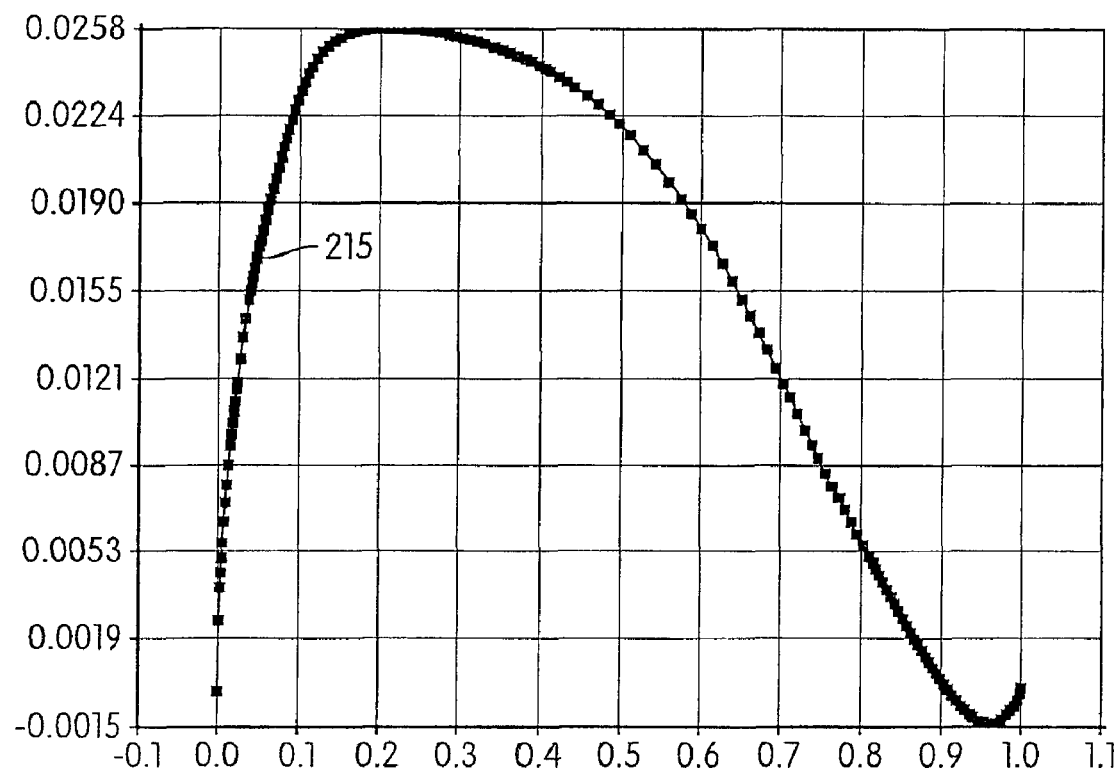
FIG. 3 is an exemplary plot of a difference between a chord line of the cross-section of FIG. 2 and a camber line of the cross-section of FIG. 2.

FIG. 3 is an exemplary plot 205 of a difference 215 between chord line 250 of cross-section 200 of FIG. 2 and camber line 260 of cross-section 200 of FIG. 2. Since chord line 250 coincides with the horizontal axis in FIG. 2, difference 215 of FIG. 3 is equivalent to camber line 260 of FIG. 2. Note that the vertical axis of FIG. 3 has a finer scale than the vertical axis of FIG. 2.

Forward camber is generally used to increase the lift of an airfoil or blade. One embodiment of the present invention is the use of aft camber to increase the lift of a main rotor blade of a helicopter. Aft camber can also be represented by the difference between the chord line and the camber line. Aft camber, for example, is a maximum in the difference between the chord line and the camber line that appears between the midpoint of the chord line and the trailing edge.

Figure 4:
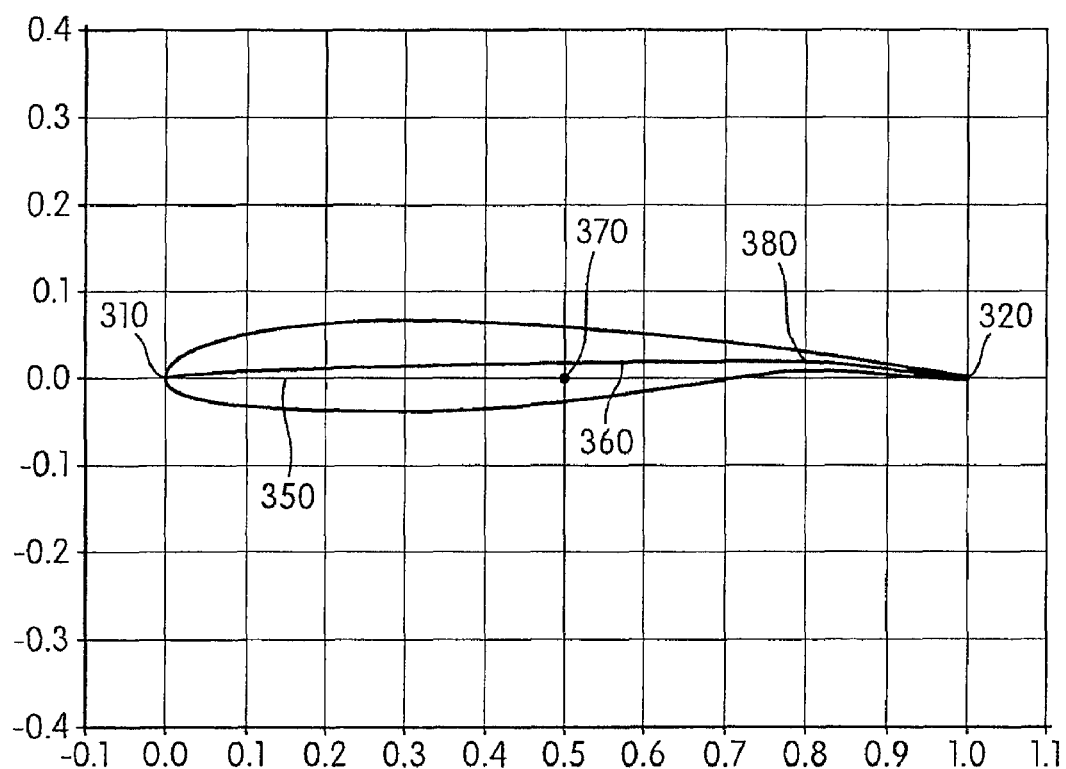
FIG. 4 is a schematic diagram of a cross-section of a main rotor blade of a helicopter where a difference between a chord line of the cross-section and a camber line of the cross-section increases from a leading edge of the cross-section to a maximum between a trailing edge of the cross-section and a midpoint of the chord line and decreases to the trailing edge producing an aft camber, in accordance with an embodiment of the present invention.
Figure 5:
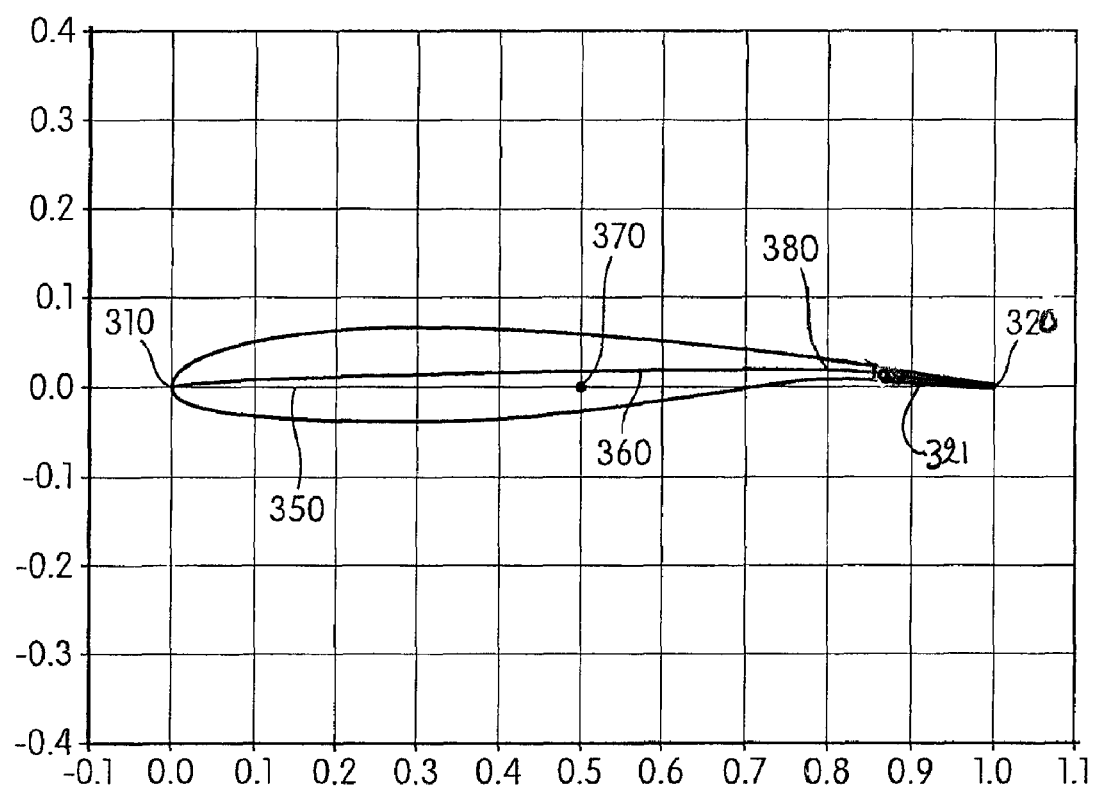
FIG. 5 is a schematic diagram of a cross-section of a main rotor blade of a helicopter showing an edge tab extension, in accordance with another embodiment of the present invention.

FIG. 4 is a schematic diagram of a cross-section 300 of a main rotor blade of a helicopter where a difference between chord line 350 of cross-section 300 and camber line 360 of cross-section 300 increases from leading edge 310 of cross-section 300 to maximum 380 between trailing edge 320 of cross-section 300 and midpoint 370 of chord line 350 and decreases to trailing edge 320 producing an aft camber, in accordance with an embodiment of the present invention. The aft camber is an integral part of the blade. In another embodiment of the present invention, the aft camber is produced by a trailing edge tab extension connected to the blade. FIG. 5 depicts schematically a cross-section of the main rotor blade of a helicopter having trailing edge tab extension 321. The trailing edge tab extension 321 is preferably connected to the blade so that it is bent down.

Figure 6:
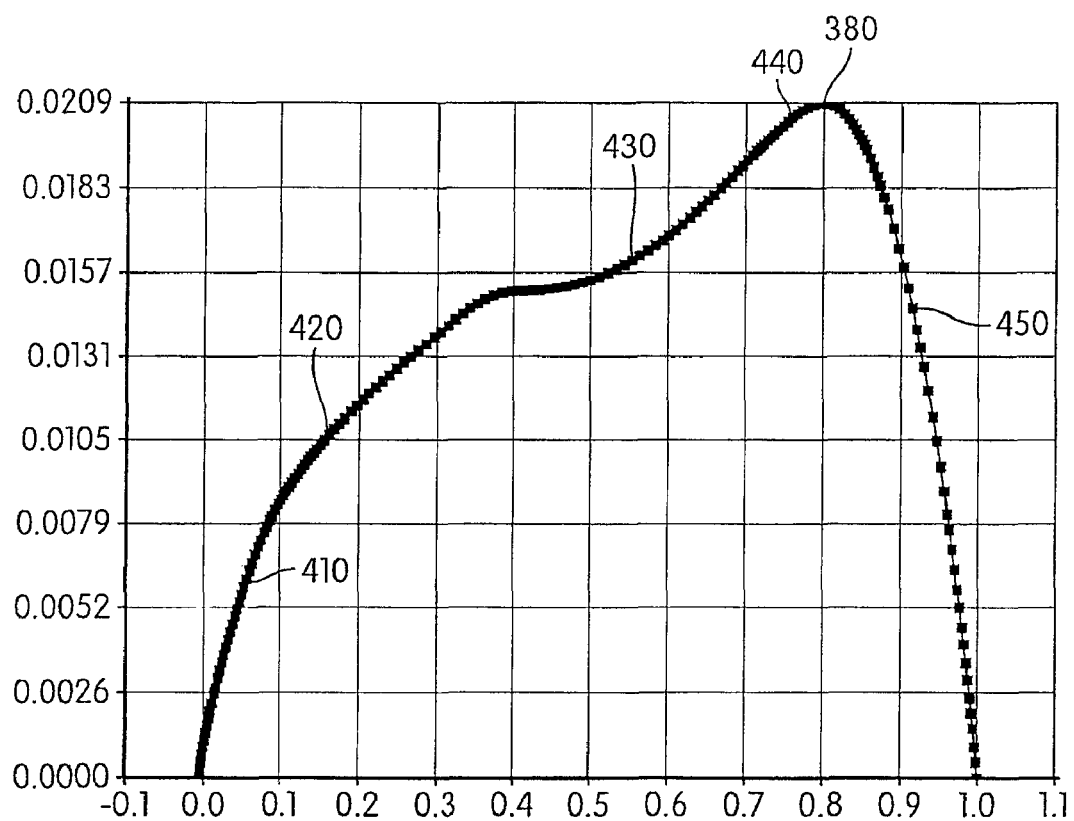
FIG. 6 is a plot of a difference between a chord line of the cross-section of FIG. 4 and a camber line of the cross-section of FIG. 4, in accordance with an embodiment of the present invention.

FIG. 6 is a plot 400 of difference 410 between chord line 350 of cross-section 300 of FIG. 4 and camber line 360 of cross-section 300 of FIG. 4, in accordance with an embodiment of the present invention. The slope of difference 410 sequentially decreases from the leading edge in section 420, increases in section 430, decreases in section 440 to maximum 380, and increases negatively in section 450 from maximum 380 to the trailing edge. The aft camber is produced as the slope of difference 410 sequentially increases in section 430, decreases in section 440 to maximum 380, and increases negatively in section 450 from maximum 380 to the trailing edge.

Figure 7:
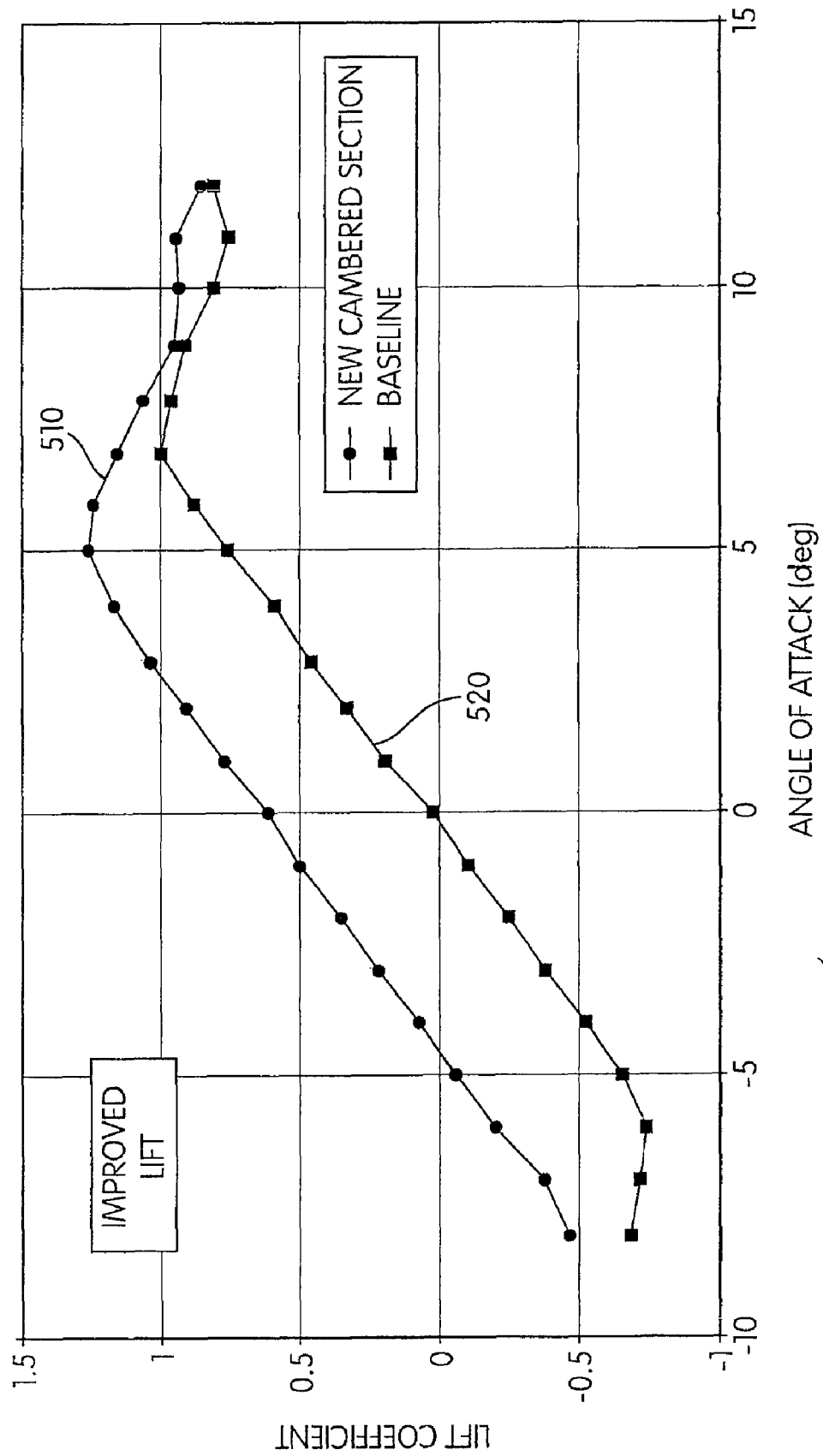
FIG. 7 is a plot of exemplary computational results that were substantiated by experimental results of lift coefficient versus angle of attack for the cross-section of FIG. 4, in accordance with an embodiment of the present invention.

FIG. 7 is a plot 500 of exemplary experimental results of lift coefficient 510 versus angle of attack for cross-section 300 of FIG. 4, in accordance with an embodiment of the present invention. Plot 500 also includes lift coefficient 520 for a baseline helicopter blade cross-section similar to cross-section 100 shown in FIG. 1. Plot 500 shows that lift coefficient 510 of an aft cambered blade cross-section is greater than lift coefficient 520 of a conventional blade cross-section at all angles of attack. Since a lift coefficient is proportional to lift, plot 500 suggests that an aft cambered blade cross-section can provide more lift than a conventional blade cross-section.

Figure 8:
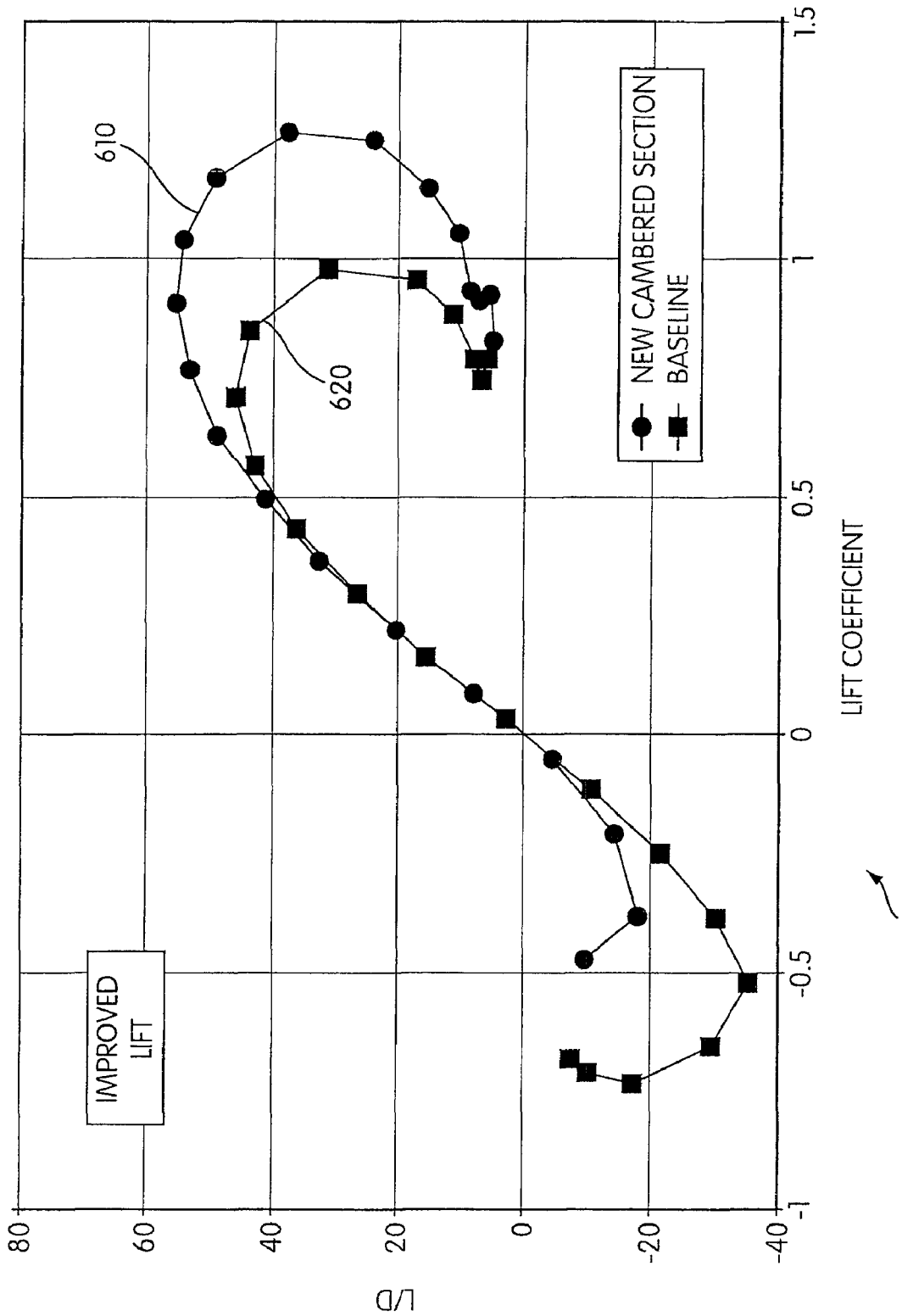
FIG. 8 is a plot of exemplary computational results that were substantiated by experimental results of a lift to drag ratio versus lift coefficient for the cross-section of FIG. 4, in accordance with an embodiment of the present invention.

FIG. 8 is a plot 600 of exemplary experimental results of a lift to drag ratio 610 versus lift coefficient for cross-section 300 of FIG. 3, in accordance with an embodiment of the present invention. Plot 600 also includes lift to drag ratio 620 for a baseline helicopter blade cross-section similar to cross-section 100 shown in FIG. 1. Plot 600 shows that lift to drag ratio 610 for the aft cambered cross-section is similar to lift to drag ratio 620 for a conventional blade cross-section for smaller values of lift coefficient.

Plot 600 also shows that lift to drag ratio 610 for the aft cambered cross-section is even higher than lift to drag ratio 620 for a conventional blade cross-section for higher values of lift coefficient. In other words, an aft cambered helicopter blade exhibits the lift to drag ratio of a conventional helicopter blade at smaller lift coefficients and exhibits a higher lift to drag ratio at higher lift coefficients. Therefore, an aft cambered helicopter blade in accordance with an embodiment of the present invention can provide higher lift with less drag than a conventional helicopter blade.

Figure 9:
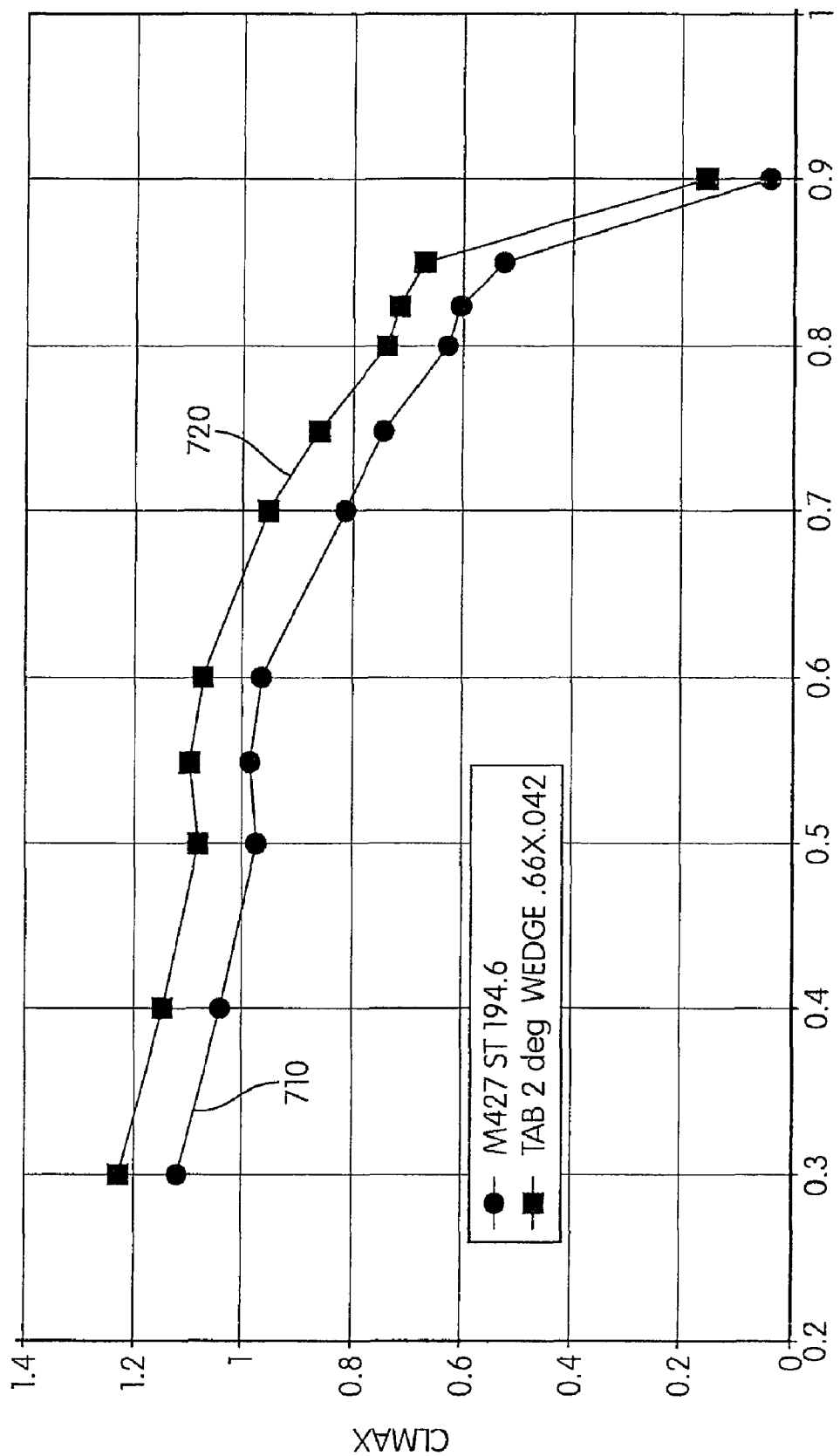
FIG. 9 is a plot of exemplary computational results that were substantiated by experimental results of a maximum lift coefficient versus Mach number for the cross-section of FIG. 4, in accordance with an embodiment of the present invention.

FIG. 9 is a plot 700 of exemplary experimental results of maximum lift coefficient 710 versus Mach number for cross-section 300 of FIG. 4, in accordance with an embodiment of the present invention. Plot 700 also includes maximum lift coefficient 720 for a baseline helicopter blade cross-section similar to cross-section 100 shown in FIG. 1. Plot 700 shows that maximum lift coefficient 710 of an aft cambered blade can be maintained close to maximum lift coefficient 720 of a conventional helicopter blade as the Mach number of the blade is increased. Maintaining maximum lift coefficient 710 close to maximum lift coefficient 720 at increasing Mach numbers means that an aft camber blade can delay stall at high Mach numbers almost as well as a conventional blade.

Figure 10:
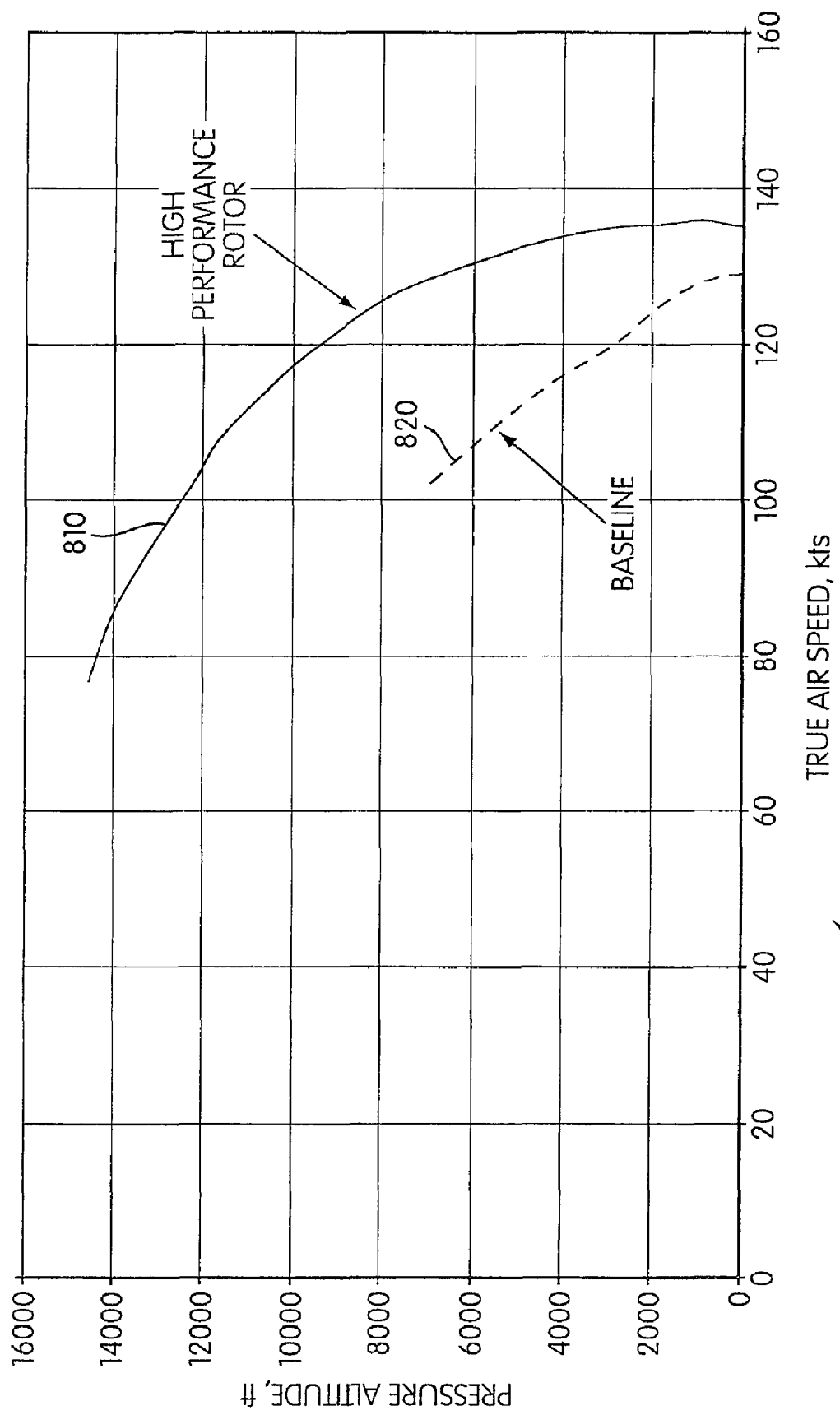
FIG. 10 is a plot of exemplary computational results that were substantiated by experimental results of a pressure altitude versus true airspeed for the cross-section of FIG. 4, in accordance with an embodiment of the present invention.

FIG. 10 is a plot 800 of exemplary experimental results of a pressure altitude 810 versus true airspeed for cross-section 300 of FIG. 4, in accordance with an embodiment of the present invention. Plot 800 also includes pressure altitude 820 for a baseline helicopter blade cross-section similar to cross-section 100 shown in FIG. 1. Plot 800 shows that pressure altitude 810 for an aft cambered blade is higher than pressure altitude 820 for a conventional blade at the same airspeed. Higher pressure altitude 810 for an aft cambered blade than pressure altitude 820 for a conventional blade means that a helicopter with an aft cambered blade can fly higher than a helicopter with a conventional blade at the same airspeed.

Figure 11:
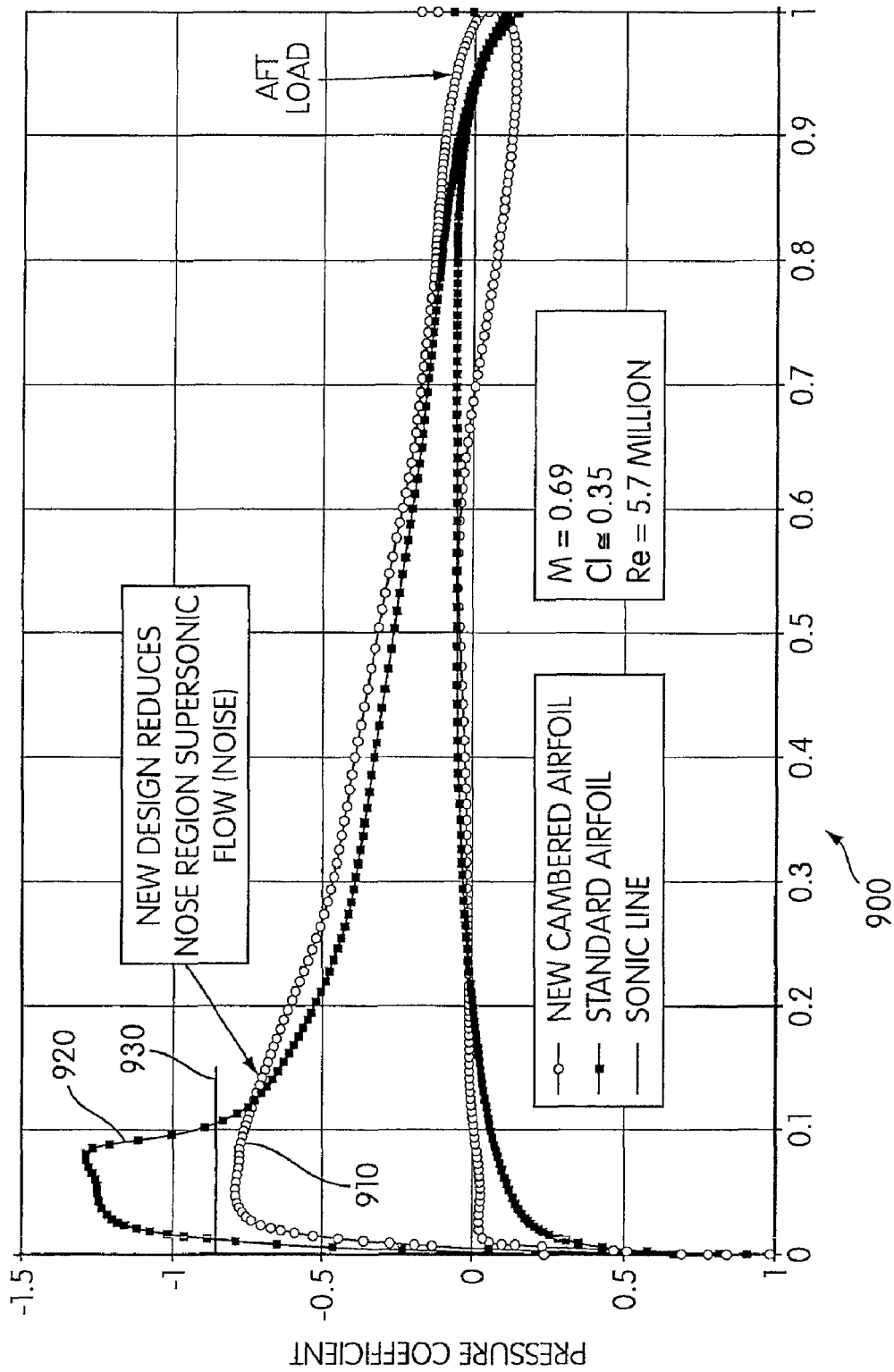
FIG. 11 is a plot of exemplary computational results that were substantiated by experimental results of a pressure coefficient versus chord line for the cross-section of FIG. 4, in accordance with an embodiment of the present invention.

FIG. 11 is a plot 900 of exemplary experimental results of pressure coefficient 910 versus chord line for cross-section 300 of FIG. 4, in accordance with an embodiment of the present invention. Plot 900 also includes pressure coefficient 920 for a baseline helicopter blade cross-section similar to cross-section 100 shown in FIG. 1. Plot 900 shows the distribution of pressure coefficient 910 across an aft cambered blade in comparison with the distribution of pressure coefficient 920 across a conventional helicopter blade. Sonic line 930 is the pressure coefficient level at which supersonic effects increase the noise level of a blade significantly. Plot 900 shows that an aft cambered blade distributes pressure coefficient 910 more evenly across the surface of the blade, which keeps pressure coefficient 910 below sonic line 930. Plot 900 also shows that a conventional blade distributes pressure 920 closer to the leading edge of the blade allowing pressure coefficient 920 to exceed sonic line 930. Plot 900 shows that an aft cambered blade can produce less noise than a conventional helicopter blade.

Figure 12:
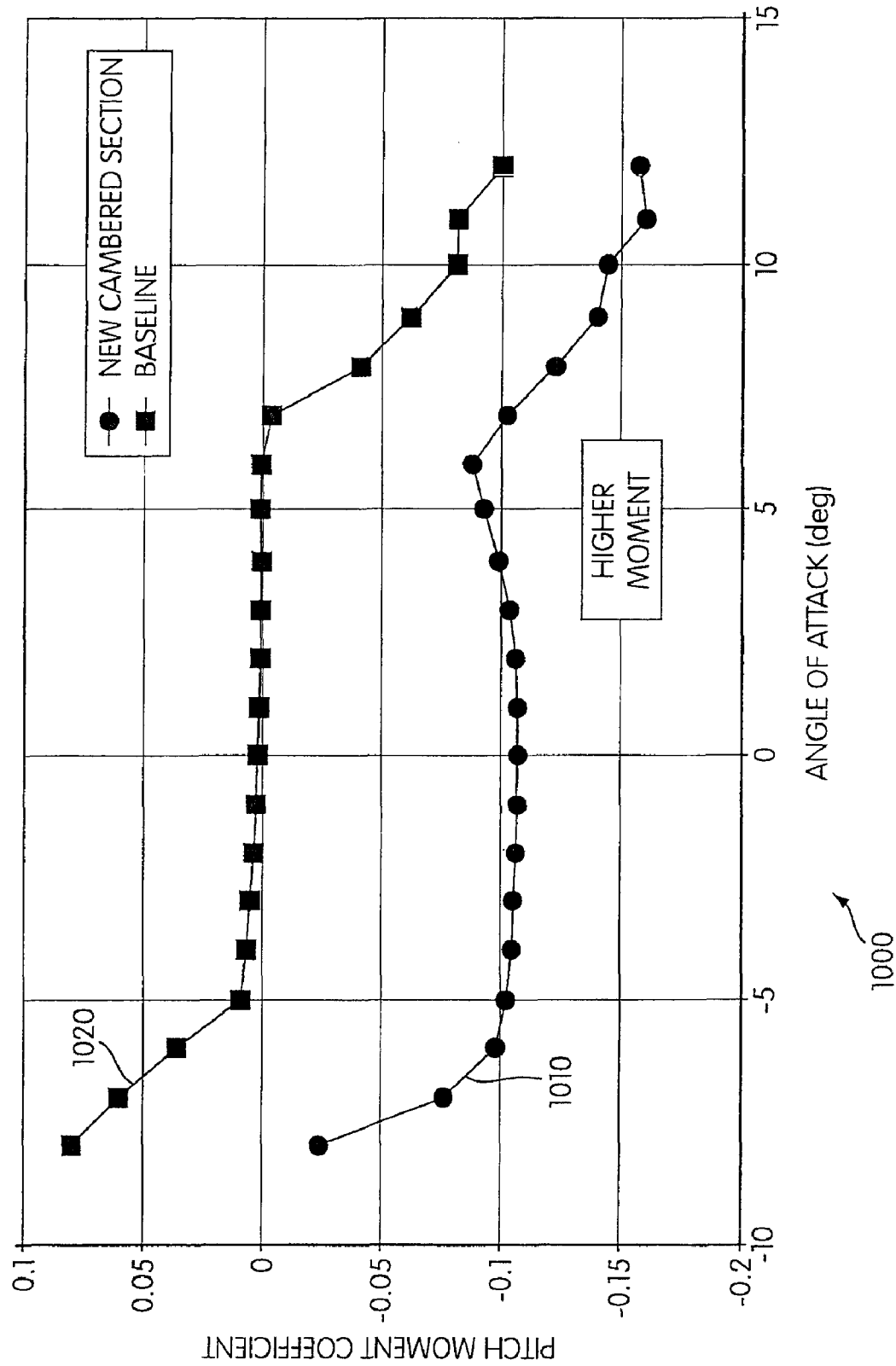
FIG. 12 is a plot of exemplary computational results that were substantiated by experimental results of a pitch moment coefficient versus angle of attack for the cross-section of FIG. 4, in accordance with an embodiment of the present invention.

FIG. 12 is a plot 1000 of exemplary experimental results of pitch moment coefficient 1010 versus angle of attack for cross-section 300 of FIG. 4, in accordance with an embodiment of the present invention. Plot 1000 also includes pitch moment coefficient 1020 for a baseline helicopter blade cross-section similar to cross-section 100 shown in FIG. 1. Plot 1000 shows that pitch moment coefficient 1010 of an aft cambered blade is greater than pitch moment coefficient 1020 of a conventional helicopter blade. The higher pitch moment coefficient 1010 for an aft cambered blade means that a helicopter using an aft cambered blade requires control system that is more powerful or more complex than a control system of a helicopter using a conventional helicopter blade.

Figure 13:
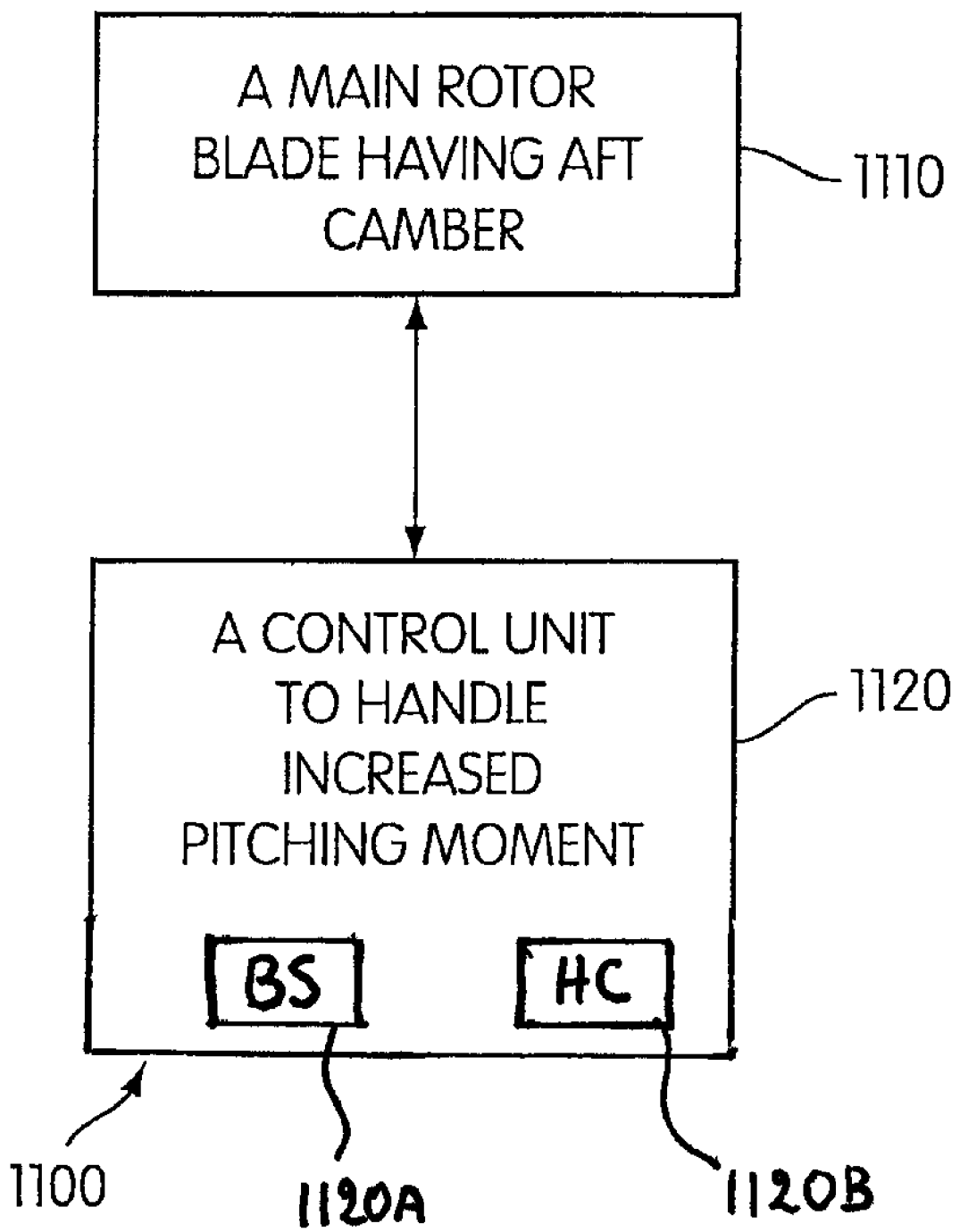
FIG. 13 is a schematic diagram of a helicopter system for generating higher lift with less drag and delaying stall at high Mach numbers, in accordance with an embodiment of the present invention.

FIG. 13 is a schematic diagram of a helicopter system 1100 for generating higher lift with less drag and delaying stall at high Mach numbers, in accordance with an embodiment of the present invention. System 1100 includes main rotor blade 1110 and control unit 1120. Main rotor blade 1110 has a cross-section that includes aft camber. The aft camber of rotor blade 1110 generates higher lift with less drag and delays stall at high Mach numbers. The aft camber of main rotor blade 1110 also increases the pitching moment of main rotor blade 1110. Control unit 1120 mitigates the increased pitching moment generated by main rotor blade 1110. Control unit 1120 can include, but is not limited to including, balancing springs (BS) 1120A, such as fixed trimmable balancing springs, electrically trimmable balancing springs, a hydraulic cylinder, or dual hydraulic cylinders (HC) 1120B.

Figure 14:
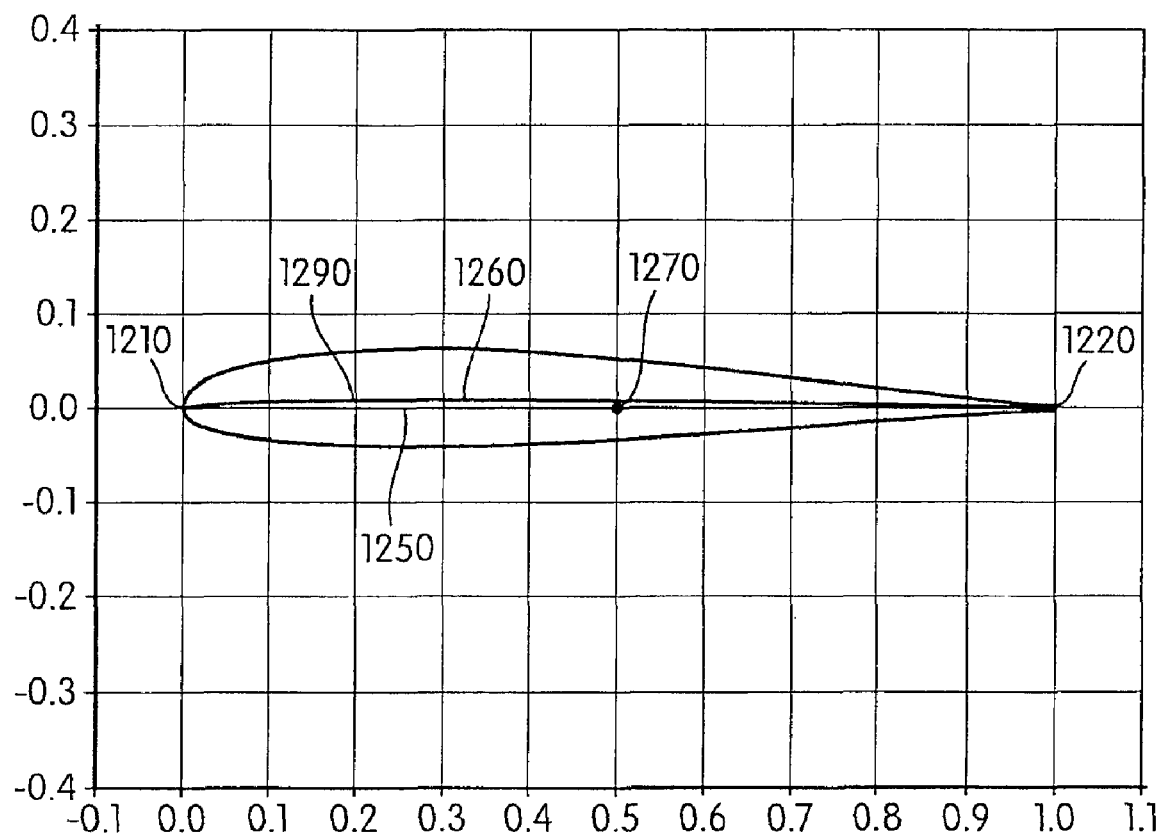
FIG. 14 is a schematic diagram of a cross-section of a main rotor blade of a helicopter where the slope of the difference between a chord line of the cross-section and a camber line of the cross-section sequentially decreases from the leading edge to a maximum, increases negatively from the maximum, decreases negatively, and increases negatively to the trailing edge producing aft camber, in accordance with an embodiment of the present invention.

FIG. 14 is a schematic diagram of a cross-section 1200 of a main rotor blade of a helicopter where the slope of the difference between chord line 1250 of cross-section 1200 and camber line 1260 of cross-section 1200 sequentially decreases from leading edge 1210 to maximum 1290, increases negatively from maximum 1290, decreases negatively, and increases negatively to trailing edge 1220 producing aft camber, in accordance with an embodiment of the present invention. The difference between chord line 1250 of cross-section 1200 and camber line 1260 of cross-section 1200 increases from leading edge 1210 of cross-section 1200 to maximum 1290 between leading edge 1210 and midpoint 1270 of chord line 1250 and decreases to trailing edge 1220 of cross-section 1200.

The aft camber is an integral part of the blade. In another embodiment of the present invention, the aft camber is produced by a trailing edge tab extension connected to the blade. The trailing edge tab extension is preferably connected to the blade so that it is bent down.

Figure 15:
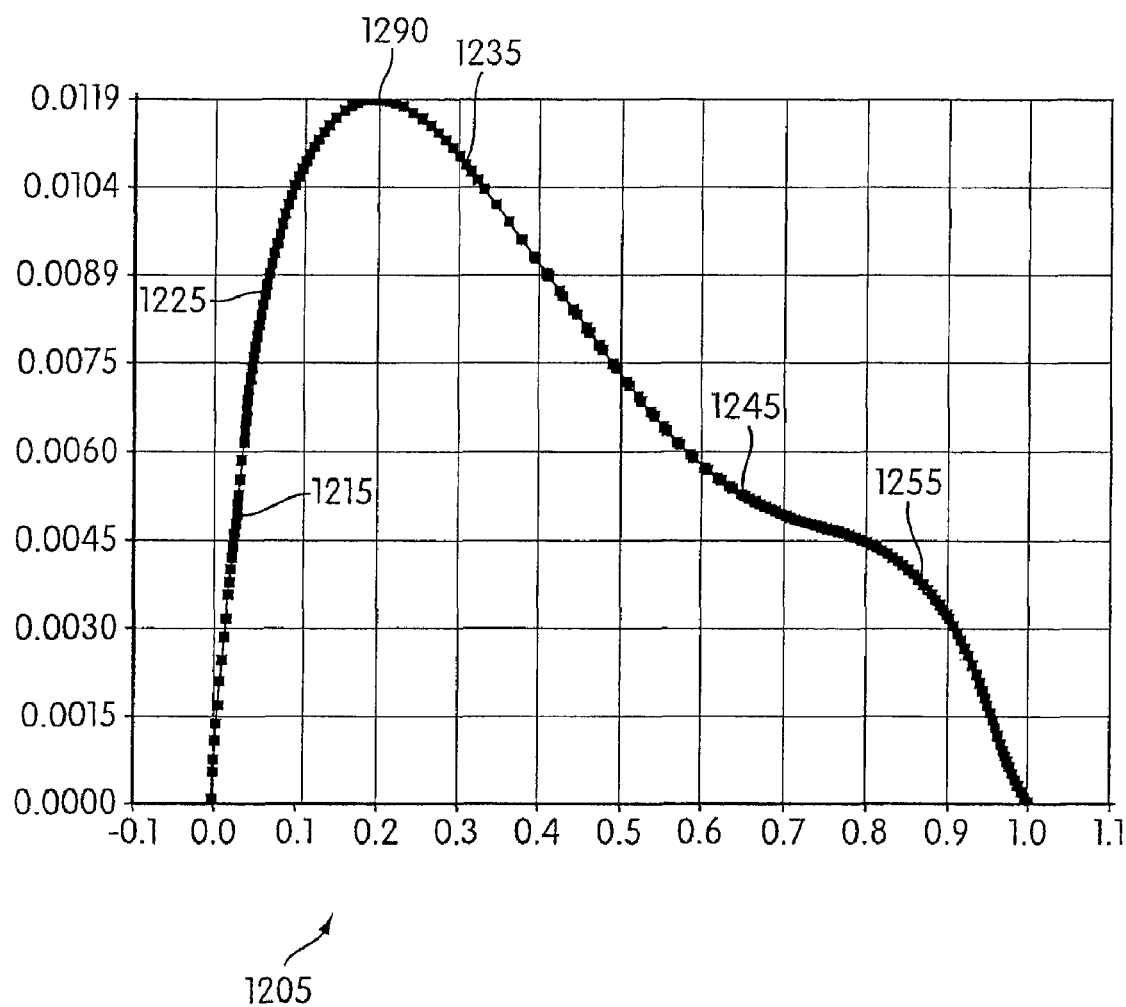
FIG. 15 is a plot of the difference between a chord line of the cross-section of FIG. 14 and a camber line of the cross-section of FIG. 14, in accordance with an embodiment of the present invention.

FIG. 15 is a plot 1205 of difference 1215 between chord line 1250 of the cross-section 1200 of FIG. 14 and camber line 1260 of cross-section 1200 of FIG. 14, in accordance with an embodiment of the present invention. The slope of difference 1215 between chord line 1250 of cross-section 1200 and camber line 1260 of cross-section 1200 sequentially decreases in section 1225 from the leading edge to maximum 1290, increases negatively in section 1235 from maximum 1290, decreases negatively in section 1245, and increases negatively in section 1255 to the trailing edge. The slope increases negatively in section 1235 from maximum 1290, decreases negatively in section 1245, and increases negatively in section 1255 to the trailing edge to produce the aft camber of the blade that generates higher lift with less drag and delays stall at high Mach numbers.

Figure 16:
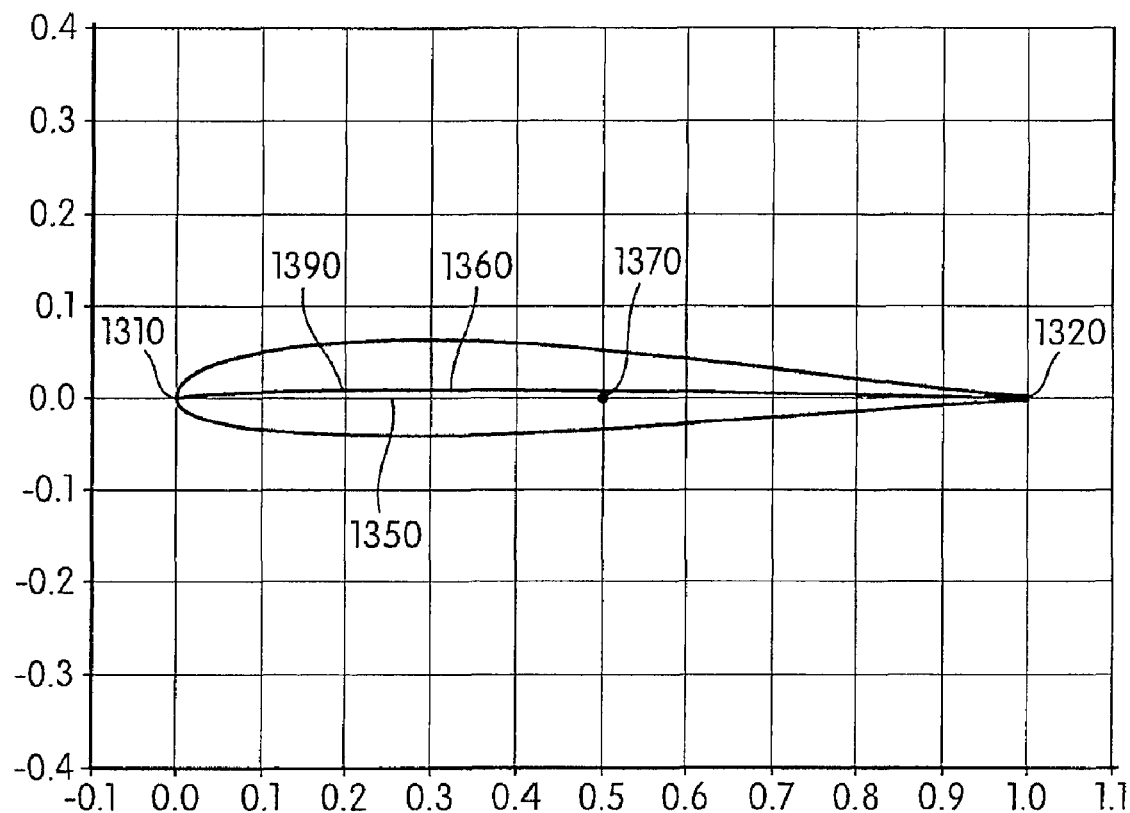
FIG. 16 is a schematic diagram of a cross-section of a main rotor blade of a helicopter where the slope of the difference between a chord line of the cross-section and a camber line of the cross-section sequentially decreases from the leading edge to a maximum, increases negatively from the maximum, decreases negatively, increases negatively, and decreases negatively to the trailing edge producing aft camber, in accordance with an embodiment of the present invention.

FIG. 16 is a schematic diagram of a cross-section 1300 of a main rotor blade of a helicopter where the slope of the difference between chord line 1350 of cross-section 1300 and camber line 1360 of cross-section 1300 sequentially decreases from leading edge 1310 to maximum 1390, increases negatively from maximum 1390, decreases negatively, increases negatively, and decreases negatively to trailing edge 1320 producing aft camber, in accordance with an embodiment of the present invention. The difference between chord line 1350 of cross-section 1300 and camber line 1360 of cross-section 1300 increases from leading edge 1310 of cross-section 1300 to maximum 1390 between leading edge 1310 and midpoint 1370 of chord line 1350 and decreases to trailing edge 1320 of cross-section 1300.

The aft camber is an integral part of the blade. In another embodiment of the present invention, the aft camber is produced by a trailing edge tab extension connected to the blade. The trailing edge tab extension is preferably connected to the blade so that it is bent down.

Figure 17:
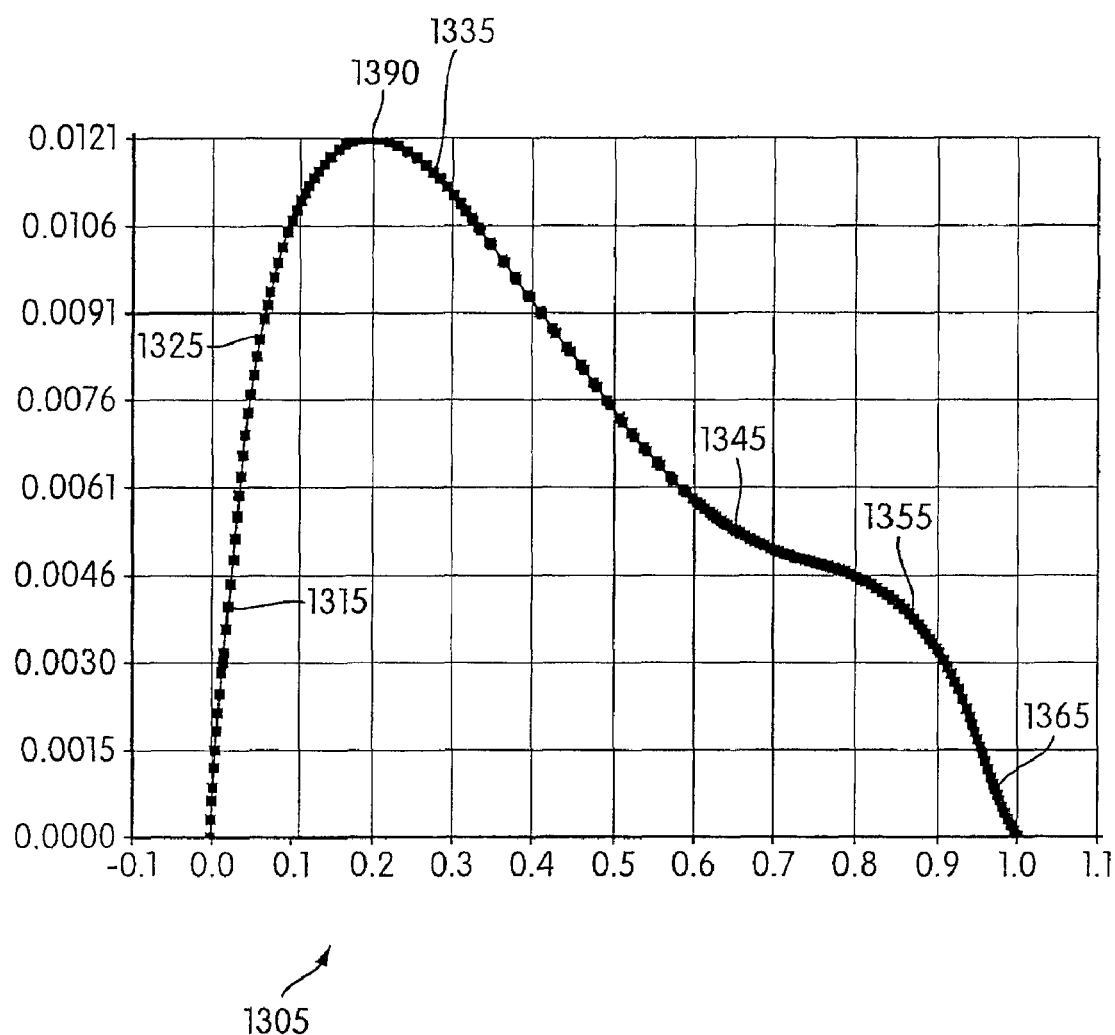
FIG. 17 is a plot of the difference between a chord line of the cross-section of FIG. 16 and a camber line of the cross-section of FIG. 16, in accordance with an embodiment of the present invention.

FIG. 17 is a plot 1305 of difference 1315 between chord line 1350 of the cross-section 1300 of FIG. 16 and camber line 1360 of cross-section 1300 of FIG. 16, in accordance with an embodiment of the present invention. The slope of difference 1315 between chord line 1350 of cross-section 1300 and camber line 1360 of cross-section 1300 sequentially decreases in section 1325 from the leading edge to maximum 1390, increases negatively in section 1335 from maximum 1390, decreases negatively in section 1345, increases negatively in section 1355, and decreases negatively in section 1365 to the trailing edge. The slope increases negatively in section 1335 from maximum 1390, decreases negatively in section 1345, increases negatively in section 1355, and decreases negatively in section 1365 to the trailing edge to produce the aft camber of the blade that generates higher lift with less drag and delays stall at high Mach numbers.

Figure 18:
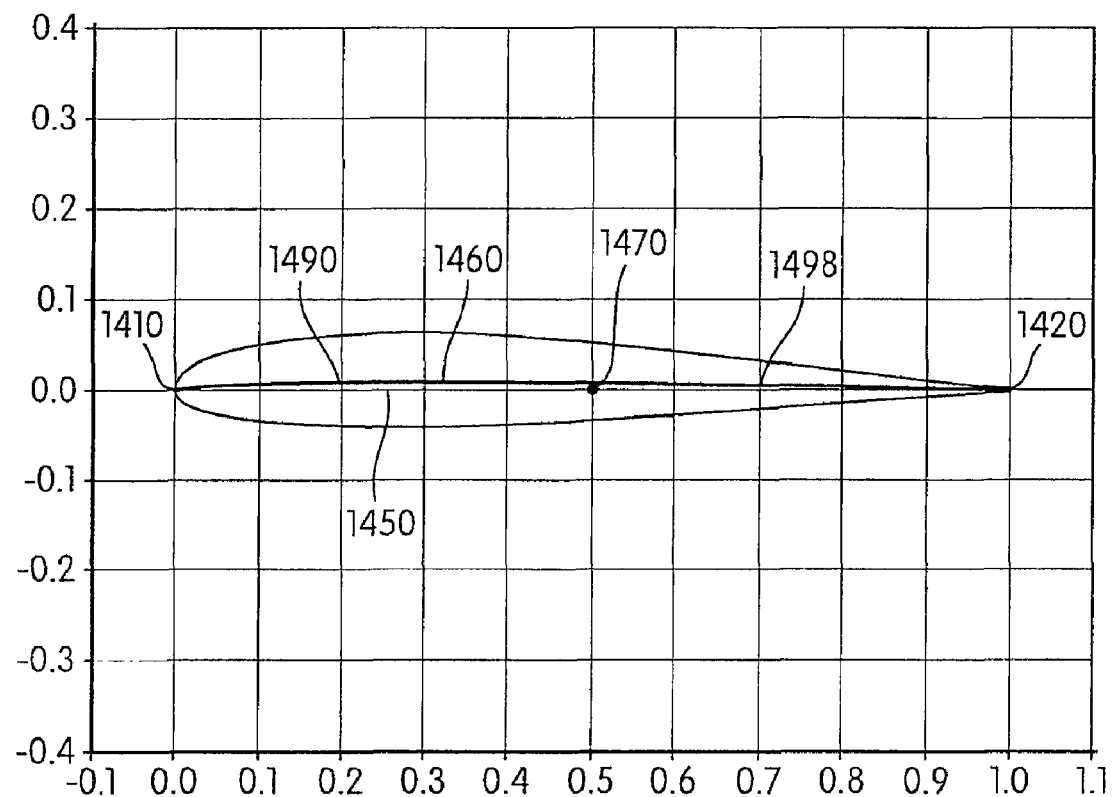
FIG. 18 is a schematic diagram of a cross-section of a main rotor blade of a helicopter where the slope of the difference between a chord line of the cross-section and a camber line of the cross-section sequentially decreases from the leading edge to a first maximum, increases negatively from the first maximum, decreases negatively to the second maximum, and increases negatively from the second maximum to the trailing edge producing aft camber, in accordance with an embodiment of the present invention.

FIG. 18 is a schematic diagram of a cross-section 1400 of a main rotor blade of a helicopter where the slope of the difference between chord line 1450 of cross-section 1400 and camber line 1460 of cross-section 1400 sequentially decreases from leading edge 1410 to first maximum 1490, increases negatively from first maximum 1490, decreases negatively to second maximum 1498, and increases negatively from second maximum 1498 to trailing edge 1420 producing aft camber, in accordance with an embodiment of the present invention. The difference between chord line 1450 of cross-section 1400 and camber line 1460 of cross-section 1400 sequentially increases from leading edge 1410 of cross-section 1400 to first maximum 1490 between leading edge 1410 and midpoint 1470 of chord line 1450, decreases to second maximum 1498 between trailing edge 1420 of cross-section 1400 and midpoint 1470, and decreases to trailing edge 1420. First maximum 1490 is preferably greater than second maximum 1498.

The aft camber is an integral part of the blade. In another embodiment of the present invention, the aft camber is produced by a trailing edge tab extension connected to the blade. The trailing edge tab extension is preferably connected to the blade so that it is bent down.

Figure 19:
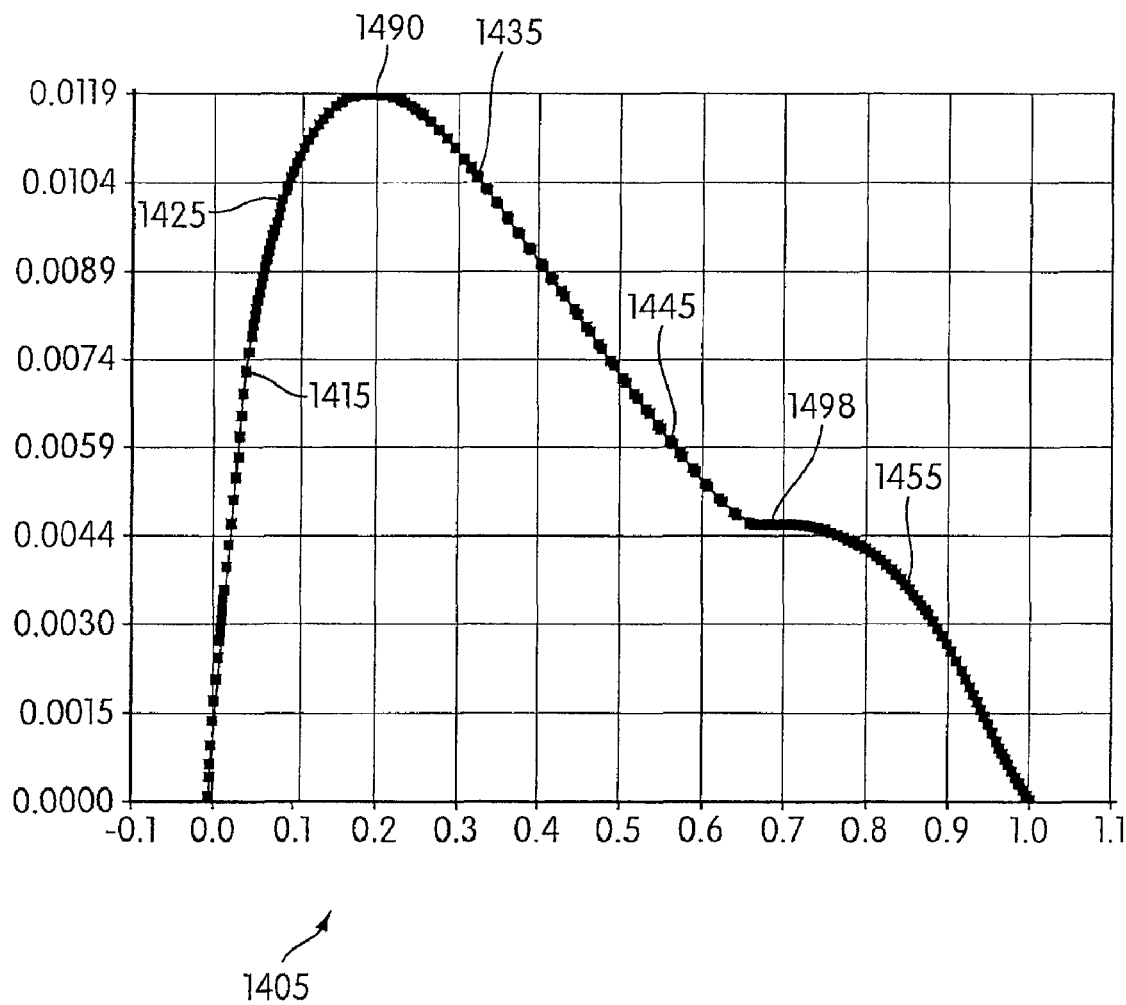
FIG. 19 is a plot of the difference between a chord line of the cross-section of FIG. 18 and a camber line of the cross-section of FIG. 18, in accordance with an embodiment of the present invention.

FIG. 19 is a plot 1405 of difference 1415 between chord line 1450 of cross-section 1400 of FIG. 18 and camber line 1460 of cross-section 1400 of FIG. 18, in accordance with an embodiment of the present invention. The slope of difference 1415 between chord line 1450 of cross-section 1400 and camber line 1460 of cross-section 1400 sequentially decreases in section 1425 from the leading edge to first maximum 1490, increases negatively in section 1435 from first maximum 1490, decreases negatively in section 1445 to second maximum 1498, and increases negatively in section 1455 from second maximum 1498 to the trailing edge. The slope increases negatively in section 1435 from first maximum 1490, decreases in section 1445 negatively to second maximum 1498, and increases negatively in section 1455 from second maximum 1498 to the trailing edge to produce the aft camber of the blade that generates higher lift with less drag and delays stall at high Mach numbers.

Figure 20:
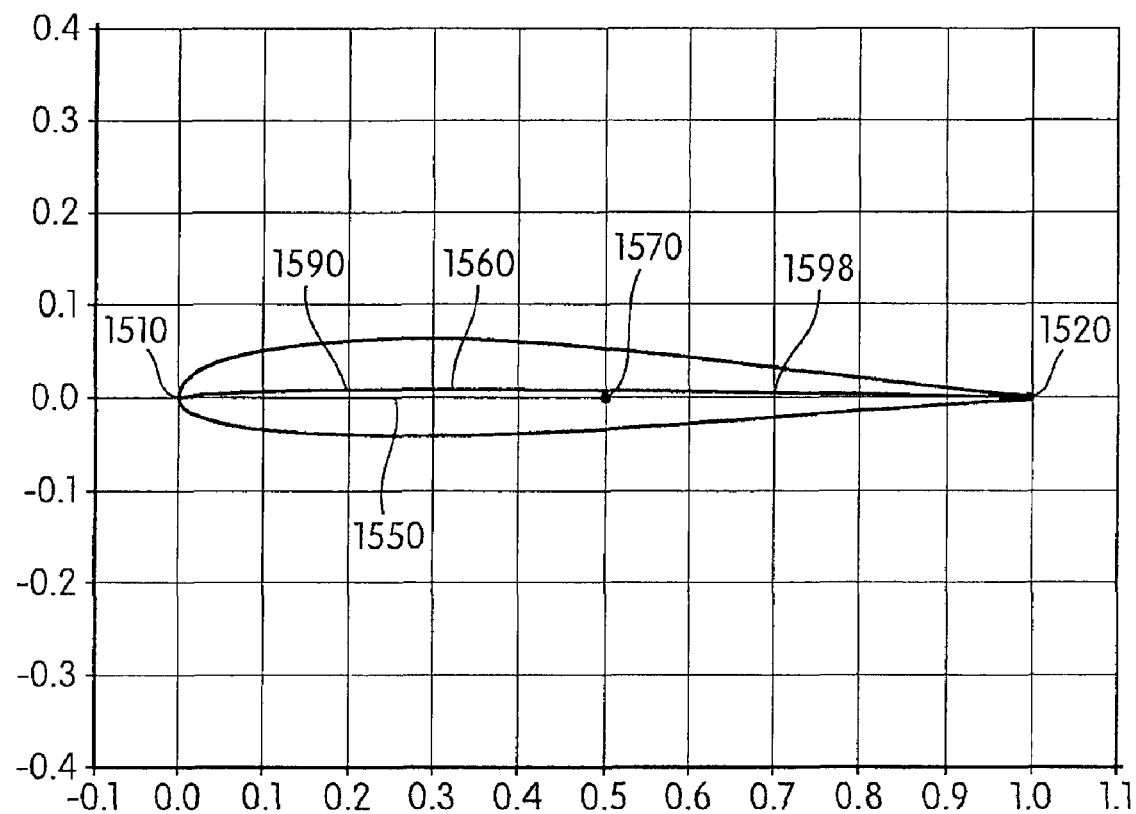
FIG. 20 is a schematic diagram of a cross-section of a main rotor blade of a helicopter where the slope of the difference between a chord line of the cross-section and a camber line of the cross-section sequentially decreases from the leading edge to a first maximum, increases negatively from the first maximum, decreases negatively to the second maximum, increases negatively from the second maximum, and decreases negatively to the trailing edge producing aft camber, in accordance with an embodiment of the present invention.

FIG. 20 is a schematic diagram of a cross-section 1500 of a main rotor blade of a helicopter where the slope of the difference between chord line 1550 of cross-section 1500 and camber line 1560 of cross-section 1500 sequentially decreases from leading edge 1510 to first maximum 1590, increases negatively from first maximum 1590, decreases negatively to second maximum 1598, increases negatively from second maximum 1598, and decreases negatively to trailing edge 1520 producing aft camber, in accordance with an embodiment of the present invention. The difference between chord line 1550 of cross-section 1500 and camber line 1560 of cross-section 1500 sequentially increases from leading edge 1510 of cross-section 1500 to first maximum 1590 between leading edge 1510 and midpoint 1570 of chord line 1550, decreases to second maximum 1598 between trailing edge 1520 of cross-section 1500 and midpoint 1570, and decreases to trailing edge 1520. First maximum 1590 is preferably greater than second maximum 1598.

The aft camber is an integral part of the blade. In another embodiment of the present invention, the aft camber is produced by a trailing edge tab extension connected to the blade. The trailing edge tab extension is preferably connected to the blade so that it is bent down.

Figure 21:
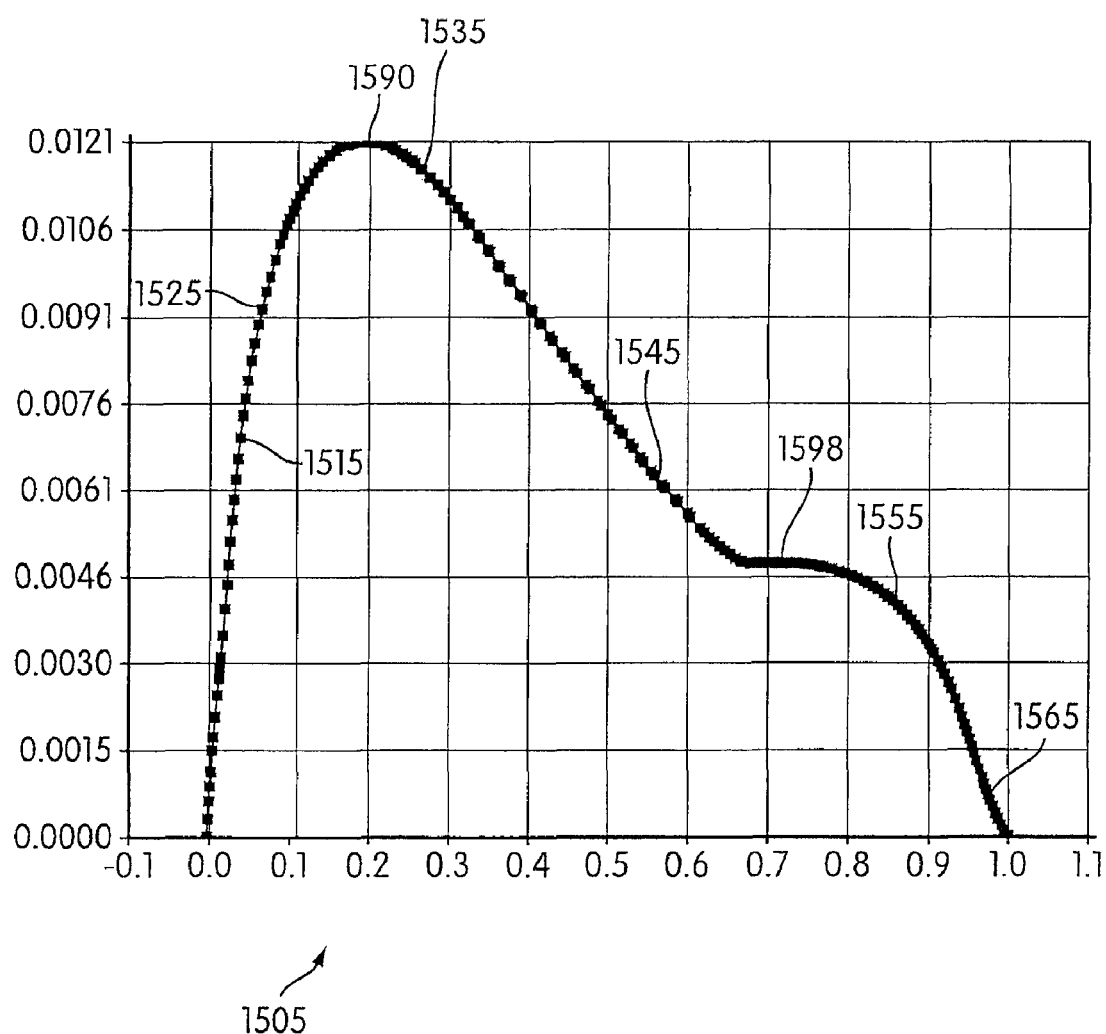
FIG. 21 is a plot of the difference between a chord line of the cross-section of FIG. 20 and a camber line of the cross-section of FIG. 20, in accordance with an embodiment of the present invention.

FIG. 21 is a plot 1505 of difference 1515 between chord line 1550 of cross-section 1500 of FIG. 20 and camber line 1560 of cross-section 1500 of FIG. 20, in accordance with an embodiment of the present invention. The slope of difference 1515 between chord line 1550 of cross-section 1500 and camber line 1560 of cross-section 1500 sequentially decreases in section 1525 from the leading edge to first maximum 1590, increases negatively in section 1535 from first maximum 1590, decreases negatively in section 1545 to second maximum 1598, increases negatively in section 1555 from second maximum 1598, and decreases negatively in section 1565 to the trailing edge. The slope increases negatively in section 1535 from first maximum 1590, decreases in section 1545 negatively to second maximum 1598, increases negatively in section 1555 from second maximum 1598, and decreases negatively in section 1565 to the trailing edge to produce the aft camber of the blade that generates higher lift with less drag and delays stall at high Mach numbers.

Figure 22:
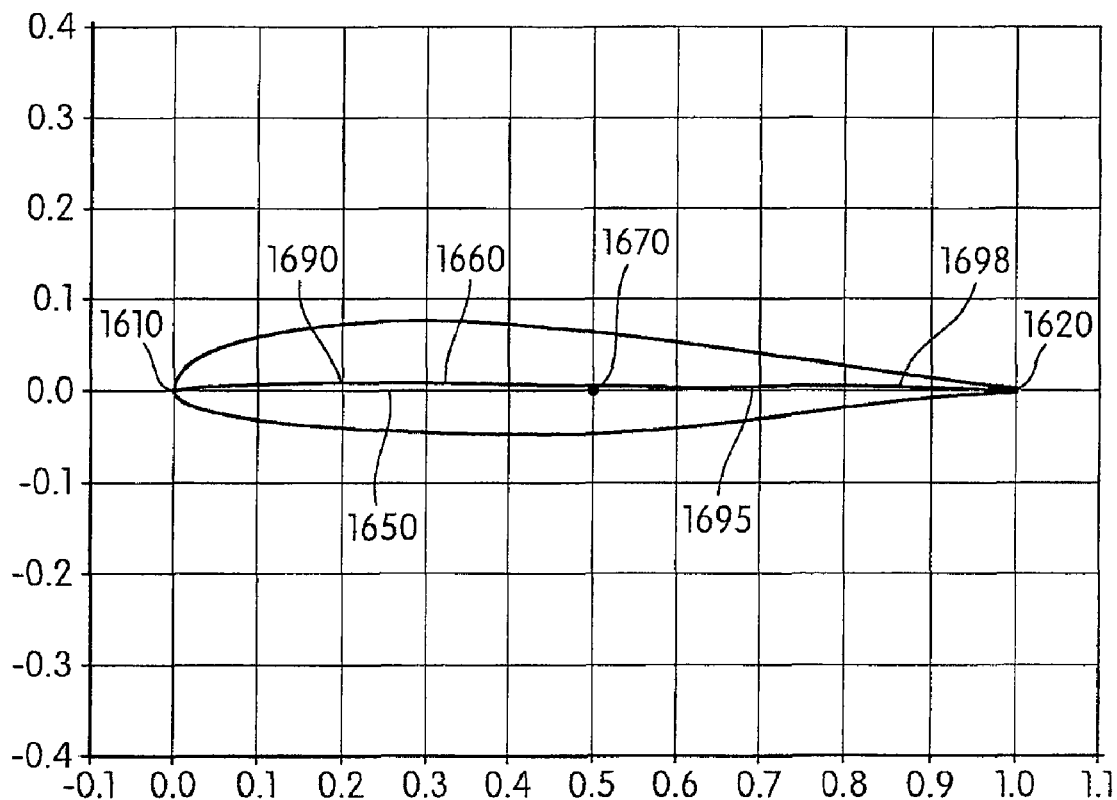
FIG. 22 is a schematic diagram of a cross-section of a main rotor blade of a helicopter where the slope of the difference between a chord line of the cross-section and a camber line of the cross-section sequentially decreases from the leading edge to the first maximum, increases negatively from the first maximum, decreases negatively to the first minimum, increases from the first minimum, decreases to the second maximum, and increases negatively from the second maximum to the trailing edge producing aft camber, in accordance with an embodiment of the present invention.

FIG. 22 is a schematic diagram of a cross-section 1600 of a main rotor blade of a helicopter where the slope of the difference between chord line 1650 of cross-section 1600 and camber line 1660 of cross-section 1600 sequentially decreases from leading edge 1610 to first maximum 1690, increases negatively from first maximum 1690, decreases negatively to first minimum 1695, increases from first minimum 1695, decreases to second maximum 1698, and increases negatively from second maximum 1698 to trailing edge 1620 producing aft camber, in accordance with an embodiment of the present invention. The difference between chord line 1650 of cross-section 1600 and camber line 1660 of cross-section 1660 sequentially increases from leading edge 1610 of cross-section 1600 to first maximum 1690 between leading edge 1610 and midpoint 1670 of chord line 1650, decreases to first minimum 1695 between trailing edge 1620 of cross-section 1600 and midpoint 1670, increases to second maximum 1698 between trailing edge 1620 and midpoint 1670, and decreases to trailing edge 1620. First maximum 1690 is preferably greater than second maximum 1698.

The aft camber is an integral part of the blade. In another embodiment of the present invention, the aft camber is produced by a trailing edge tab extension connected to the blade. The trailing edge tab extension is preferably connected to the blade so that it is bent down.

Figure 23:
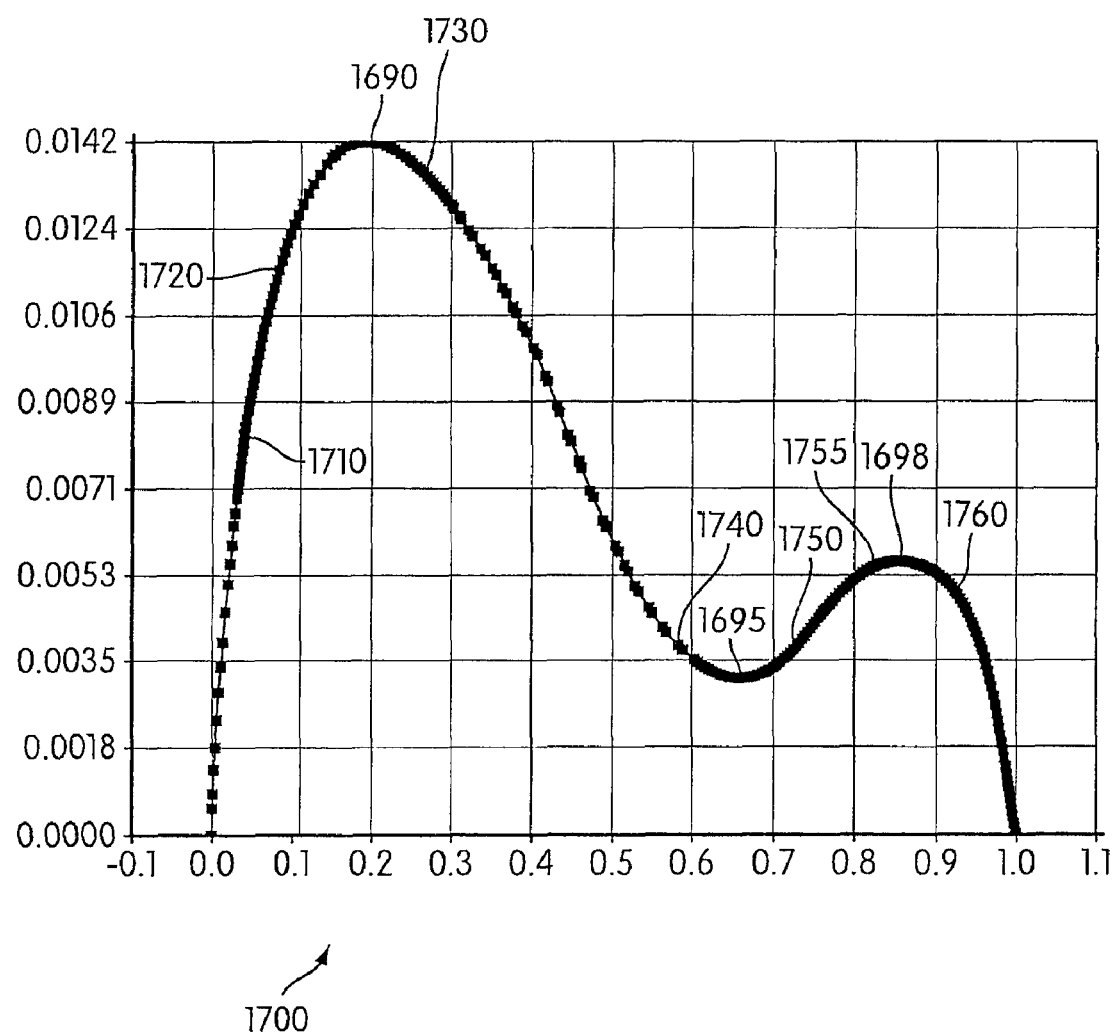
FIG. 23 is a plot of the difference between a chord line of the cross-section of FIG. 22 and a camber line of the cross-section of FIG. 22, in accordance with an embodiment of the present invention.

FIG. 23 is a plot 1700 of difference 1710 between chord line 1650 of cross-section 1600 of FIG. 22 and camber line 1660 of cross-section 1600 of FIG. 22, in accordance with an embodiment of the present invention. The slope of difference 1710 between chord line 1650 of cross-section 1600 and camber line 1660 of cross-section 1600 sequentially decreases in section 1720 from the leading edge to first maximum 1690, increases negatively in section 1730 from first maximum 1690, decreases negatively in section 1740 to first minimum 1695, increases in section 1750 from first minimum 1695, decreases in section 1755 to second maximum 1698, and increases negatively in section 1760 from second maximum 1698 to the trailing edge. The slope sequentially increases negatively in section 1730 from first maximum 1690, decreases negatively in section 1740 to first minimum 1695, increases in section 1750 from first minimum 1695, decreases in section 1755 to second maximum 1698, and increases negatively in section 1760 from second maximum 1698 to the trailing edge to produce the aft camber of the blade that generates higher lift with less drag and delays stall at high Mach numbers.

Figure 24:
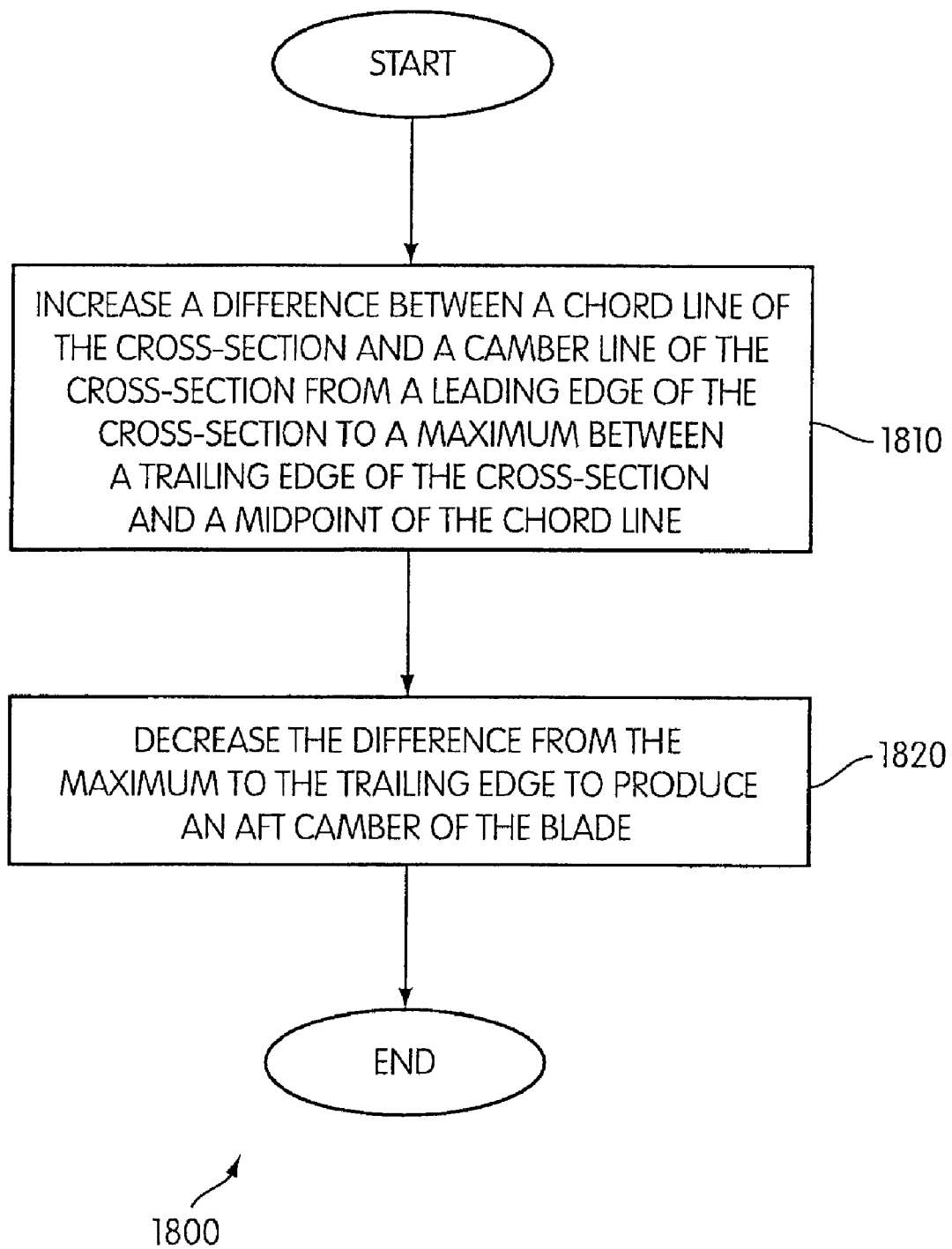
FIG. 24 is a flowchart showing a method for designing an aft cambered cross-section of a main rotor helicopter blade where a difference between a chord line of the cross-section and a camber line of the cross-section reaches a maximum between a midpoint of the chord line and the trailing edge of the cross-section, in accordance with an embodiment of the present invention.

FIG. 24 is a flowchart showing a method 1800 for designing an aft cambered cross-section of a main rotor helicopter blade where a difference between a chord line of the cross-section and a camber line of the cross-section reaches a maximum between a midpoint of the chord line and the trailing edge of the cross-section, in accordance with an embodiment of the present invention.

In step 1810 of method 1800, a difference between a chord line of the cross-section and a camber line of the cross-section is increased from a leading edge of the cross-section to a maximum between a trailing edge of the cross-section and a midpoint of the chord line.

In step 1820, the difference is decreased from the maximum to the trailing edge to produce an aft camber of the blade. The aft camber generates higher lift with less drag and delays stall at high Mach numbers.

A slope of the difference sequentially decreases from the leading edge, increases, decreases to the maximum, and increases negatively from the maximum to the trailing edge. The slope sequentially increases, decreases to the maximum, and increases from the maximum to the trailing edge to produce the aft camber.

Figure 25:
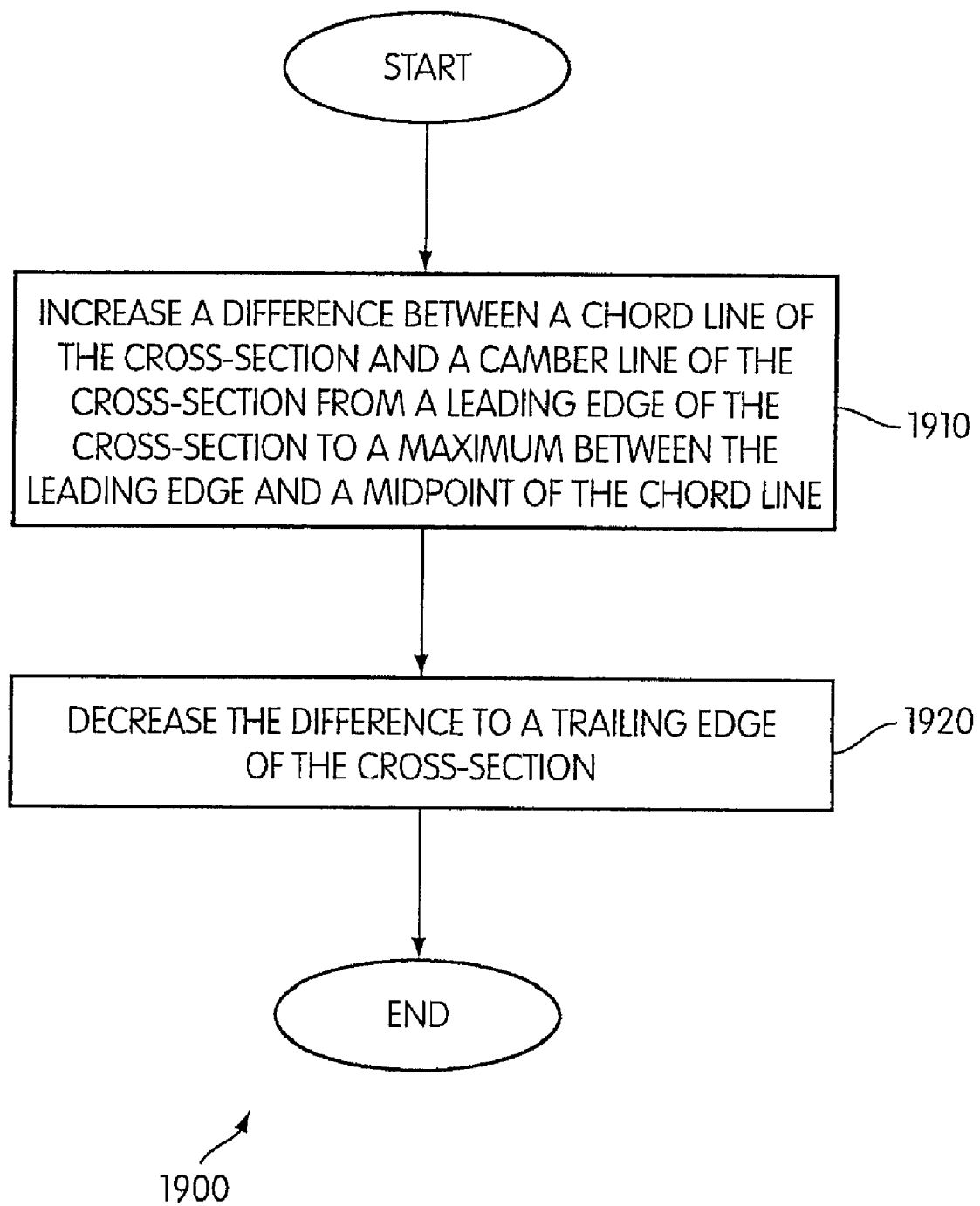
FIG. 25 is a flowchart showing a method for designing an aft cambered cross-section of a main rotor helicopter blade where a difference between a chord line of the cross-section and a camber line of the cross-section reaches a maximum between a leading edge of the cross-section and a midpoint of the chord line, in accordance with an embodiment of the present invention.

FIG. 25 is a flowchart showing a method 1900 for designing an aft cambered cross-section of a main rotor helicopter blade where a difference between a chord line of the cross-section and a camber line of the cross-section reaches a maximum between a leading edge of the cross-section and a midpoint of the chord line, in accordance with an embodiment of the present invention.

In step 1910 of method 1900, a difference between a chord line of the cross-section and a camber line of the cross-section is increased from a leading edge of the cross-section to a maximum between the leading edge and a midpoint of the chord line.

In step 1920, the difference is decreased to a trailing edge of the cross-section. In one embodiment of method 1900, a slope of the difference sequentially decreases from the leading edge to the maximum, increases negatively from the maximum, decreases negatively, and increases negatively to the trailing edge. The slope increases negatively from the maximum, decreases negatively, and increases negatively to the trailing edge to produce an aft camber of the blade. The aft camber generates higher lift with less drag and delays stall at high Mach numbers.

In another embodiment of method 1900, a slope of the difference sequentially decreases from the leading edge to the maximum, increases negatively from the maximum, decreases negatively, increases negatively, and decreases negatively to the trailing edge. The slope increases negatively from the maximum, decreases negatively, increases negatively, and decreases negatively to the trailing edge to produce an aft camber of the blade. The aft camber generates higher lift with less drag and delays stall at high Mach numbers.

Figure 26:
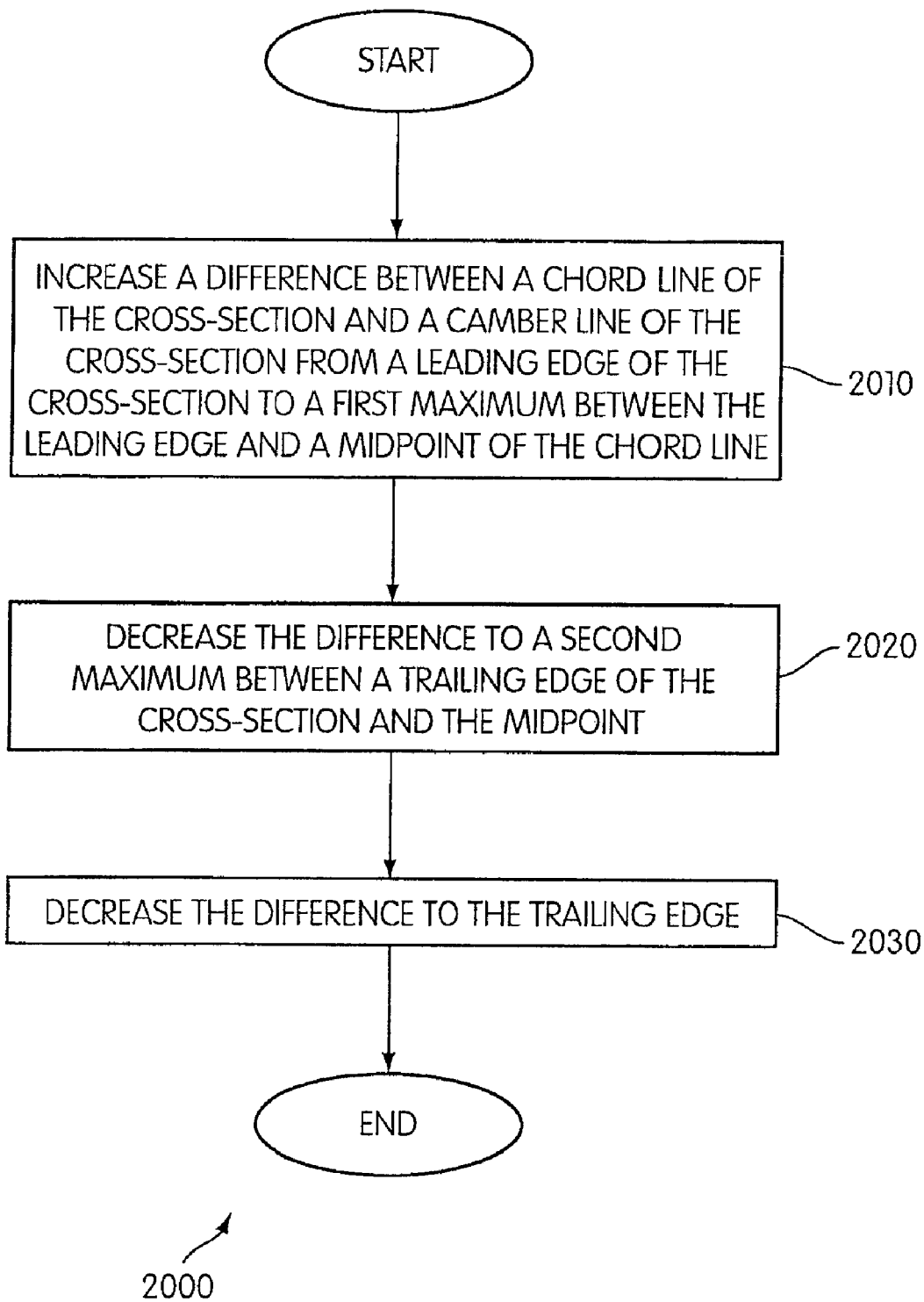
FIG. 26 is a flowchart showing a method for designing an aft cambered cross-section of a main rotor helicopter blade where a difference between a chord line of the cross-section and a camber line of the cross-section reaches a first maximum between a leading edge of the cross-section and a midpoint of the chord line and a second maximum between the midpoint and the trailing edge of the cross-section, in accordance with an embodiment of the present invention.

FIG. 26 is a flowchart showing a method 2000 for designing an aft cambered cross-section of a main rotor helicopter blade where a difference between a chord line of the cross-section and a camber line of the cross-section reaches a first maximum between a leading edge of the cross-section and a midpoint of the chord line and a second maximum between the midpoint and the trailing edge of the cross-section, in accordance with an embodiment of the present invention.

In step 2010 of method 2000, a difference between a chord line of the cross-section and a camber line of the cross-section is increased from a leading edge of the cross-section to a first maximum between the leading edge and a midpoint of the chord line.

In step 2020, the difference is decreased to a second maximum between a trailing edge of the cross-section and the midpoint.

In step 2030, the difference is decreased to the trailing edge. In one embodiment of method 2000, a slope of the difference sequentially decreases from the leading edge to the first maximum, increases negatively from the first maximum, decreases negatively to the second maximum, and increases negatively from the second maximum to the trailing edge. The slope increases negatively from the first maximum, decreases negatively to the second maximum, and increases negatively from second maximum to the trailing edge to produce an aft camber of the blade. The aft camber generates higher lift with less drag and delays stall at high Mach numbers.

In another embodiment of method 2000, a slope of the difference sequentially decreases from the leading edge to the first maximum, increases negatively from the first maximum, decreases negatively to the second maximum, increases negatively from the second maximum, and decreases negatively to the trailing edge. The slope increases negatively from the first maximum, decreases negatively to the second maximum, increases negatively from second maximum, and decreases negatively to the trailing edge to produce an aft camber of the blade. The aft camber generates higher lift with less drag and delays stall at high Mach numbers.

Figure 27:
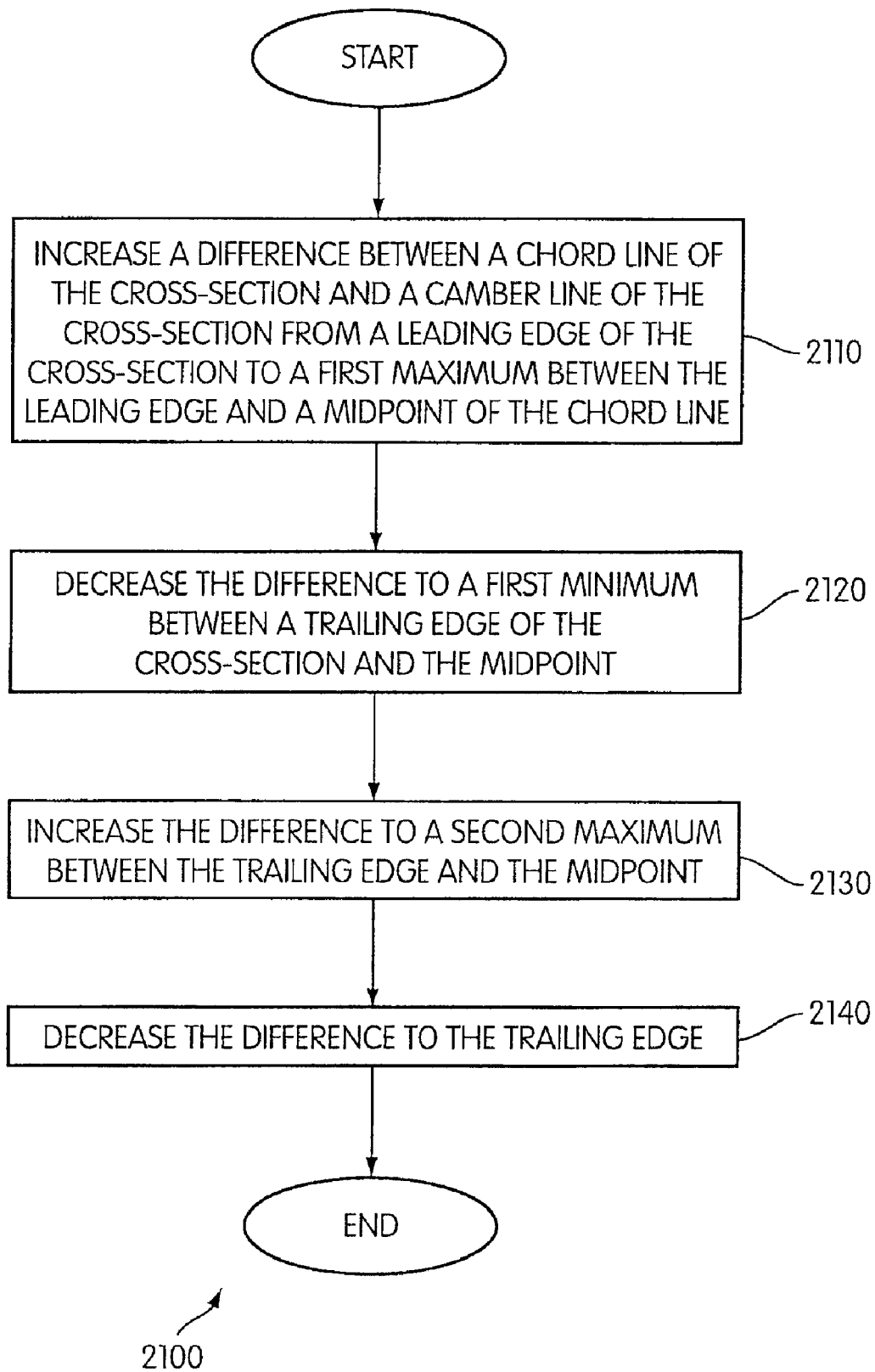
FIG. 27 is a flowchart showing a method for designing an aft cambered cross-section of a main rotor helicopter blade where a difference between a chord line of the cross-section and a camber line of the cross-section sequentially reaches a first maximum between a leading edge of the cross-section and a midpoint of the chord line, a minimum, and a second maximum between the midpoint and the trailing edge of the cross-section, in accordance with an embodiment of the present invention.

FIG. 27 is a flowchart showing a method 2100 for designing an aft cambered cross-section of a main rotor helicopter blade where a difference between a chord line of the cross-section and a camber line of the cross-section sequentially reaches a first maximum between a leading edge of the cross-section and a midpoint of the chord line, a minimum, and a second maximum between the midpoint and the trailing edge of the cross-section, in accordance with an embodiment of the present invention.

In step 2110 of method 2100, a difference between a chord line of the cross-section and a camber line of the cross-section is increased from a leading edge of the cross-section to a first maximum between the leading edge and a midpoint of the chord line.

In step 2120, the difference is decreased to a first minimum between a trailing edge of the cross-section and the midpoint.

In step 2130, the difference is increased to a second maximum between the trailing edge and the midpoint.

In step 2140, the difference is decreased to the trailing edge. A slope of the difference sequentially decreases from the leading edge to the first maximum, increases negatively from the first maximum, decreases negatively to the first minimum, increases from the first minimum, decreases to the second maximum, and increases negatively from the second maximum to the trailing edge. The slope increases negatively from the first maximum, decreases negatively to the first minimum, increases from the first minimum, decreases to the second maximum, and increases negatively from the second maximum to the trailing edge to produce the aft camber of the blade. The aft camber generates higher lift with less drag and delays stall at high Mach numbers.

Systems and methods in accordance with an embodiment of the present invention disclosed herein can significantly increase the maximum lift capability of a main rotor blade of a helicopter by employing aft camber. A maximum lift is attained at all Mach numbers. A large nose down blade pitching moment twists the blade towards ideal hover twist. The increased maximum lift capability delays the retreating blade stall to higher speeds, weights, and altitudes, resulting in improved speeds and rate of climb at higher blade loadings and altitudes.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A main rotor helicopter blade for generating higher lift with less drag and delaying stall at high Mach numbers comprising:
    a cross-section, wherein a difference between a chord line of the cross-section and a camber line of the cross-section increases from a leading edge of the cross-section to a maximum between the leading edge and a midpoint of the chord line and decreases to a trailing edge of the cross-section, wherein a slope of the difference sequentially decreases from the leading edge to the maximum, increases negatively from the maximum, decreases negatively, and increases negatively to the trailing edge, and wherein the slope increases negatively from the maximum, decreases negatively, and increases negatively to the trailing edge to produce an aft camber of the blade that generates higher lift with less drag and delays stall at high Mach numbers.

2. The blade of claim 1, wherein the aft camber is an integral part of the blade.

3. The blade of claim 1, wherein the aft camber comprises a trailing edge tab extension that is bent down.

4. A main rotor helicopter blade for generating higher lift with less drag and delaying stall at high Mach numbers comprising:
    a cross-section, wherein a difference between a chord line of the cross-section and a camber line of the cross-section increases from a leading edge of the cross-section to a maximum between the leading edge and a midpoint of the chord line and decreases to a trailing edge of the cross-section, wherein a slope of the difference sequentially decreases from the leading edge to the maximum, increases negatively from the maximum, decreases negatively, increases negatively, and decreases negatively to the trailing edge, and wherein the slope increases negatively from the maximum, decreases negatively, increases negatively, and decreases negatively to the trailing edge to produce an aft camber of the blade that generates higher lift with less drag and delays stall at high Mach numbers.

5. The blade of claim 4, wherein the aft camber is an integral part of the blade.

6. The blade of claim 4, wherein the aft camber comprises a trailing edge tab extension that is bent down.

7. A main rotor helicopter blade for generating higher lift with less drag and delaying stall at high Mach numbers comprising:
a cross-section, wherein a difference between a chord line of the cross-section and a camber line of the cross-section sequentially increases from a leading edge of the cross-section to a first maximum between the leading edge and a midpoint of the chord line, decreases to a second maximum between a trailing edge of the cross-section and the midpoint, and decreases to the trailing edge, wherein a slope of the difference sequentially decreases from the leading edge to the first maximum, increases negatively from the first maximum, decreases negatively to the second maximum, and increases negatively from the second maximum to the trailing edge, and wherein the slope increases negatively from the first maximum, decreases negatively to the second maximum, and increases negatively from the second maximum to the trailing edge to produce an aft camber of the blade that generates higher lift with less drag and delays stall at high Mach numbers.

8. The blade of claim 7, wherein the first maximum is greater than the second maximum.

9. The blade of claim 7, wherein the aft camber is an integral part of the blade.

10. The blade of claim 7, wherein the aft camber comprises a trailing edge tab extension that is bent down.

11. A main rotor helicopter blade for generating higher lift with less drag and delaying stall at high Mach numbers comprising:
a cross-section, wherein a difference between a chord line of the cross-section and a camber line of the cross-section sequentially increases from a leading edge of the cross-section to a first maximum between the leading edge and a midpoint of the chord line, decreases to a second maximum between a trailing edge of the cross-section and the midpoint, and decreases to the trailing edge, wherein a slope of the difference sequentially decreases from the leading edge to the first maximum, increases negatively from the first maximum, decreases negatively to the second maximum, increases negatively from the second maximum, and decreases negatively to the trailing edge, and wherein the slope increases negatively from the first maximum, decreases negatively to the second maximum, increases negatively from the second maximum, and decreases negatively to the trailing edge to produce an aft camber of the blade that generates higher lift with less drag and delays stall at high Mach numbers.

12. The blade of claim 11, wherein the first maximum is greater than the second maximum.

13. The blade of claim 11, wherein the aft camber is an integral part of the blade.

14. The blade of claim 11, wherein the aft camber comprises a trailing edge tab extension that is bent down.

15. A helicopter system for generating higher lift with less drag and delaying stall at high Mach numbers comprising:
a main rotor blade having a cross-section comprising an aft camber; and
a control unit, wherein the main rotor blade generates higher lift with less drag and delays stall at high Mach numbers and the control unit mitigates an increased pitching moment generated by the aft camber of the main rotor blade,
wherein a difference between a chord line of the cross-section and a camber line of the cross-section sequentially increases from a leading edge of the cross-section to a maximum between the leading edge and a midpoint of the chord line and decreases to a trailing edge of the cross-section, wherein a slope of the difference sequentially decreases from the leading edge to the maximum, increases negatively from the maximum, decreases negatively, and increases negatively to the trailing edge, and wherein the slope increases negatively from the maximum, decreases negatively, and increases negatively to the trailing edge to produce the aft camber of the blade that generates higher lift with less drag and delays stall at high Mach numbers.

16. The system of claim 15, wherein the control unit comprises fixed trimmable balancing springs.

17. The system of claim 15, wherein the control unit comprises electrically trimmable balancing springs.

18. The system of claim 15, wherein the control unit comprises a hydraulic cylinder.

19. A helicopter system for generating higher lift with less drag and delaying stall at high Mach numbers comprising:
a main rotor blade having a cross-section comprising an aft camber; and
a control unit, wherein the main rotor blade generates higher lift with less drag and delays stall at high Mach numbers and the control unit mitigates an increased pitching moment generated by the aft camber of the main rotor blade,
wherein a difference between a chord line of the cross-section and a camber line of the cross-section sequentially increases from a leading edge of the cross-section to a maximum between the leading edge and a midpoint of the chord line and decreases to a trailing edge of the cross-section, wherein a slope of the difference sequentially decreases from the leading edge to the maximum, increases negatively from the maximum, decreases negatively, increases negatively, and decreases negatively to the trailing edge, and wherein the slope increases negatively from the maximum, decreases negatively, increases negatively, and decreases negatively to the trailing edge to produce the aft camber of the blade that generates higher lift with less drag and delays stall at high Mach numbers.

20. A helicopter system for generating higher lift with less drag and delaying stall at high Mach numbers comprising:
a main rotor blade having a cross-section comprising an aft camber; and
a control unit, wherein the main rotor blade generates higher lift with less drag and delays stall at high Mach numbers and the control unit mitigates an increased pitching moment generated by the aft camber of the main rotor blade,
wherein a difference between a chord line of the cross-section and a camber line of the cross-section sequentially increases from a leading edge of the cross-section to a first maximum between the leading edge and a midpoint of the chord line, decreases to a second maximum between a trailing edge of the cross-section and the midpoint, and decreases to the trailing edge, wherein a slope of the difference sequentially decreases from the leading edge to the first maximum, increases negatively from the first maximum, decreases negatively to the second maximum, and increases negatively from the second maximum to the trailing edge, and wherein the slope increases negatively from the first maximum, decreases negatively to the second maximum, and increases negatively from second maximum to the trailing edge to produce the aft camber of the blade that generates higher lift with less drag and delays stall at high Mach numbers.

21. A helicopter system for generating higher lift with less drag and delaying stall at high Mach numbers comprising:
a main rotor blade having a cross-section comprising an aft camber; and
a control unit, wherein the main rotor blade generates higher lift with less drag and delays stall at high Mach numbers and the control unit mitigates an increased pitching moment generated by the aft camber of the main rotor blade,
wherein a difference between a chord line of the cross-section and a camber line of the cross-section sequentially increases from a leading edge of the cross-section to a first maximum between the leading edge and a midpoint of the chord line, decreases to a second maximum between a trailing edge of the cross-section and the midpoint, and decreases to the trailing edge, wherein a slope of the difference sequentially decreases from the leading edge to the first maximum, increases negatively from the first maximum, decreases negatively to the second maximum, increases negatively from the second maximum, and decreases negatively to the trailing edge, and wherein the slope increases negatively from the first maximum, decreases negatively to the second maximum, increases negatively from second maximum, and decreases negatively to the trailing edge to produce the aft camber of the blade that generates higher lift with less drag and delays stall at high Mach numbers.

22. A method for designing a cross-section of a main rotor helicopter blade for generating higher lift with less drag and delaying stall at high Mach numbers comprising:
increasing a difference between a chord line of the cross-section and a camber line of the cross-section from a leading edge of the cross-section to a maximum between the leading edge and a midpoint of the chord line; and
decreasing the difference to a trailing edge of the cross-section, wherein a slope of the difference sequentially decreases from the leading edge to the maximum, increases negatively from the maximum, decreases negatively, and increases negatively to the trailing edge, and wherein the slope increases negatively from the maximum, decreases negatively, and increases negatively to the trailing edge to produce an aft camber of the blade that generates higher lift with less drag and delays stall at high Mach numbers.

23. A method for designing a cross-section of a main rotor helicopter blade for generating higher lift with less drag and delaying stall at high Mach numbers comprising:
increasing a difference between a chord line of the cross-section and a camber line of the cross-section from a leading edge of the cross-section to a maximum between the leading edge and a midpoint of the chord line; and
decreasing the difference to a trailing edge of the cross-section, wherein a slope of the difference sequentially decreases from the leading edge to the maximum, increases negatively from the maximum, decreases negatively, increases negatively, and decreases negatively to the trailing edge, and wherein the slope increases negatively from the maximum, decreases negatively, increases negatively, and decreases negatively to the trailing edge to produce an aft camber of the blade that generates higher lift with less drag and delays stall at high Mach numbers.

24. A method for designing a cross-section of a main rotor helicopter blade for generating higher lift with less drag and delaying stall at high Mach numbers comprising:
increasing a difference between a chord line of the cross-section and a camber line of the cross-section from a leading edge of the cross-section to a first maximum between the leading edge and a midpoint of the chord line;
decreasing the difference to a second maximum between a trailing edge of the cross-section and the midpoint; and
decreasing the difference to the trailing edge, wherein a slope of the difference sequentially decreases from the leading edge to the first maximum, increases negatively from the first maximum, decreases negatively to the second maximum, and increases negatively from the second maximum to the trailing edge, and wherein the slope increases negatively from the first maximum, decreases negatively to the second maximum, and increases negatively from second maximum to the trailing edge to produce an aft camber of the blade that generates higher lift with less drag and delays stall at high Mach numbers.

25. A method for designing a cross-section of a main rotor helicopter blade for generating higher lift with less drag and delaying stall at high Mach numbers comprising:
increasing a difference between a chord line of the cross-section and a camber line of the cross-section from a leading edge of the cross-section to a first maximum between the leading edge and a midpoint of the chord line;
decreasing the difference to a second maximum between a trailing edge of the cross-section and the midpoint; and
decreasing the difference to the trailing edge, wherein a slope of the difference sequentially decreases from the leading edge to the first maximum, increases negatively from the first maximum, decreases negatively to the second maximum, increases negatively from the second maximum, and decreases negatively to the trailing edge, and wherein the slope increases negatively from the first maximum, decreases negatively to the second maximum, increases negatively from second maximum, and decreases negatively to the trailing edge to produce an aft camber of the blade that generates higher lift with less drag and delays stall at high Mach numbers.

* * * * *